(12) United States Patent
Matsubara et al.

(10) Patent No.: US 12,464,740 B2
(45) Date of Patent: Nov. 4, 2025

(54) SEMICONDUCTOR DEVICE AND MODULE

(71) Applicant: Murata Manufacturing Co., Ltd., Nagaokakyo (JP)

(72) Inventors: Hiroshi Matsubara, Nagaokakyo (JP); Masatomi Harada, Nagaokakyo (JP); Takeshi Kagawa, Nagaokakyo (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 605 days.

(21) Appl. No.: 17/880,113

(22) Filed: Aug. 3, 2022

(65) Prior Publication Data

US 2022/0376036 A1 Nov. 24, 2022

Related U.S. Application Data

(63) Continuation of application No. PCT/JP2021/005626, filed on Feb. 16, 2021.

(30) Foreign Application Priority Data

Feb. 17, 2020 (JP) ................................. 2020-024563

(51) Int. Cl.
*H10D 1/68* (2025.01)
*H01G 4/008* (2006.01)
(Continued)

(52) U.S. Cl.
CPC ............. *H10D 1/696* (2025.01); *H01G 4/008* (2013.01); *H01G 4/10* (2013.01); *H01G 4/232* (2013.01); *H01G 4/30* (2013.01)

(58) Field of Classification Search
CPC .......... H01G 4/005; H01G 4/012; H01G 4/10; H01G 4/224; H01G 4/228; H01G 4/232;
(Continued)

(56) References Cited

U.S. PATENT DOCUMENTS

2011/0044011 A1  2/2011 Ohtsuka et al.
2016/0322164 A1* 11/2016 Shindo ................. H01G 4/33
(Continued)

FOREIGN PATENT DOCUMENTS

JP  2011044613 A  3/2011
WO  2016021529 A1  2/2016
(Continued)

OTHER PUBLICATIONS

International Search Report in PCT/JP2021/005626, mailed May 11, 2021, 3 pages.

*Primary Examiner* — Fazli Erdem

(74) *Attorney, Agent, or Firm* — ArentFox Schiff LLP

(57) ABSTRACT

A semiconductor device is provided that includes a substrate 10 with first and second opposing main surfaces, a circuit layer disposed on the first main surface, and a first resin body on a surface of the circuit layer opposite from the substrate. The circuit layer includes first and second electrode layers on a side of the semiconductor substrate, a dielectric layer disposed between the electrode layers, a first outer electrode electrically connected to the first electrode layer and extended to the surface of the circuit layer, and a second outer electrode electrically connected to the second electrode layer and extended to the surface of the circuit layer. The first resin body is between the first and second outer electrodes in a plan view, and in sectional view, a tip end of the first resin body is positioned higher than tip ends of the first and second outer electrodes.

20 Claims, 11 Drawing Sheets

(51) Int. Cl.
   *H01G 4/10*     (2006.01)
   *H01G 4/232*    (2006.01)
   *H01G 4/30*     (2006.01)
(58) Field of Classification Search
   CPC ............ H01G 4/252; H01G 4/30; H01G 4/33;
                   H10D 84/00; H10D 84/038
   USPC ....................................................... 257/355
   See application file for complete search history.

(56)             References Cited

U.S. PATENT DOCUMENTS

2017/0345815 A1* 11/2017 Ashimine ........... H01L 23/5228
2018/0226391 A1   8/2018 Ueki
2022/0059290 A1*  2/2022 Matsubara ............... H01G 4/30

FOREIGN PATENT DOCUMENTS

WO        2017057422 A1     4/2017
WO    WO-2019208221 A1 * 10/2019 ............... H01G 4/33

* cited by examiner

SEMICONDUCTOR DEVICE AND MODULE

CROSS REFERENCE TO RELATED APPLICATIONS

This application is a continuation of PCT Application No. PCT/JP2021/005626, filed Feb. 16, 2021, which claims priority to Japanese Patent Application No. 2020-024563, filed Feb. 17, 2020, the entire contents of each of which are hereby incorporated by reference in their entirety.

TECHNICAL FIELD

The present invention relates to a semiconductor device and a module.

BACKGROUND

A metal-insulator-metal (MIM) capacitor is currently used as a typical capacitor element in a semiconductor integrated circuit. The MIM capacitor has a parallel-flat-plate structure in which a dielectric layer is sandwiched between a lower electrode and an upper electrode.

For example, Japanese Unexamined Patent Application Publication No. 2011-44613 (hereinafter "Patent Document 1") discloses an electronic component including a circuit element formed on a substrate, an electrode layer to be connected to the circuit element, a protection layer covering the electrode layer, and a terminal electrode connected to the electrode layer using a via conductor extending through the protection layer and provided above the protection layer; and one end of the terminal electrode is positioned on a side wall surface of the protection layer.

In the electronic component described in Patent Document 1, the terminal electrode protrudes most. When such an electronic component is mounted on a wiring substrate, for example, a load is applied to the terminal electrode that is protruding. Consequently, the load is transmitted in a thickness direction of the electronic component via the terminal electrode, and the circuit element may be broken when being mounted.

SUMMARY OF THE INVENTION

Thus, it is an object of the present invention to provide a semiconductor device in which breakage of a capacitor element is suppressed even when a load is applied. Further, it is an object of the present invention to provide a module including the semiconductor device described above.

In an exemplary aspect, a semiconductor device is provided that includes a semiconductor substrate having a first main surface and a second main surface opposite to each other in a thickness direction, a circuit layer disposed on the first main surface of the semiconductor substrate, and a first resin body disposed on a surface of the circuit layer on a side opposite from the semiconductor substrate. Moreover, the circuit layer includes a first electrode layer disposed on a side of the semiconductor substrate, a second electrode layer disposed to face the first electrode layer, a dielectric layer interposed between the first electrode layer and the second electrode layer in the thickness direction, a first outer electrode electrically connected to the first electrode layer and extended to the surface of the circuit layer on the side opposite from the semiconductor substrate, and a second outer electrode electrically connected to the second electrode layer and extended to the surface of the circuit layer on the side opposite from the semiconductor substrate. According to the exemplary aspect, the first resin body is disposed between the first outer electrode and the second outer electrode in a plan view thereof, and, in sectional view, a tip end of the first resin body on the side opposite from the semiconductor substrate is positioned higher than tip ends of the first outer electrode and the second outer electrode on the side opposite from the semiconductor substrate.

Moreover, a module is disclosed herein that includes the semiconductor device of the exemplary aspect and a wiring substrate having a first land electrically connected to the first outer electrode and a second land electrically connected to the second outer electrode.

According to the exemplary embodiments described herein, a semiconductor device is provided in which breakage of a capacitor element is suppressed even when a load is applied. Further, a module is also provided that includes the semiconductor device described above.

DETAILED DESCRIPTION OF EMBODIMENTS

Hereinafter, a semiconductor device of the present invention and a module of the present invention will be described. It is noted that the present invention is not limited to the following configurations, and may appropriately be changed without departing from the gist of the present invention as would be appreciated to one skilled in the art. Further, combinations of individual preferable configurations described below are also included in the present invention.

Each exemplary embodiment described below is an example, and it is reiterated that partial replacement or combination of configurations described in different embodiments is possible. In the second embodiment and subsequent embodiments, a description of items common to the first embodiment will be omitted, and different points will mainly be described. In particular, similar functions and effects achieved with similar configurations will not be described one by one for each embodiment. In the following description, when the embodiments are not particularly distinguished from each other, they are simply referred to as "semiconductor device of the present disclosure" and "module of the present disclosure".

First Exemplary Embodiment

In an exemplary aspect, the semiconductor device disclosed herein includes a semiconductor substrate having a first main surface and a second main surface opposite to each other in a thickness direction, a circuit layer provided on the first main surface of the semiconductor substrate, and a first resin body provided on a surface of the circuit layer on a side opposite from the semiconductor substrate. The circuit layer includes a first electrode layer provided on a side of the semiconductor substrate, a second electrode layer that faces the first electrode layer, a dielectric layer provided between the first electrode layer and the second electrode layer in the thickness direction, a first outer electrode electrically connected to the first electrode layer and extended to the surface of the circuit layer on the side opposite from the semiconductor substrate, and a second outer electrode electrically connected to the second electrode layer and extended to the surface of the circuit layer on the side opposite from the semiconductor substrate. The first resin body is provided between the first outer electrode and the second outer electrode in a plan view (e.g., of the first main surface of the substrate), and in sectional view, a tip end of the first resin body on the side opposite from the semiconductor substrate is positioned higher than tip ends of the first outer electrode and the second outer electrode on the side opposite from the semiconductor substrate. Further, in the semiconductor device of the present disclosure, the first resin body can be provided to at least three positions surrounding a center of the semiconductor substrate in a plan view. Such an example will be described below as a semiconductor device of a first exemplary embodiment.

Figure 1:
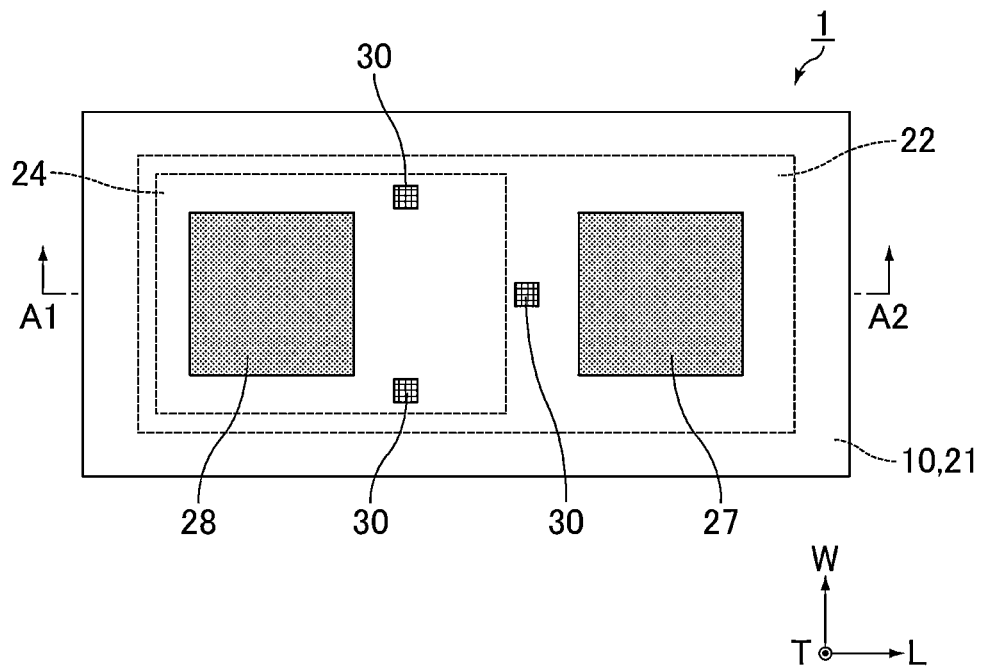
FIG. 1 is a schematic plan view of a semiconductor device of a first exemplary embodiment.
Figure 2:
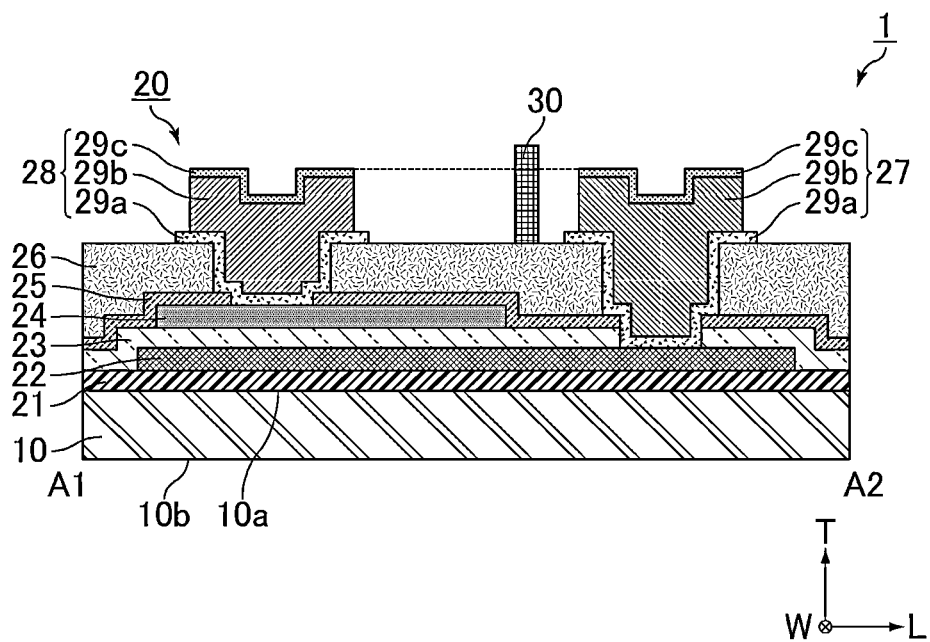
FIG. 2 is a schematic sectional view of a portion corresponding to a line segment A1-A2 in FIG. 1.

FIG. 1 is a schematic plan view of the semiconductor device of the first exemplary embodiment. FIG. 2 is a schematic sectional view of a portion corresponding to a line segment A1-A2 in FIG. 1.

In the present description, a length direction, a width direction, and a thickness direction of a semiconductor device are directions determined with an arrow L, an arrow W, and an arrow T, respectively, as illustrated in FIG. 1, FIG. 2, and other drawings. As shown in the exemplary embodiments, a length direction L, a width direction W, and a thickness direction T are orthogonal to each other.

As illustrated in FIG. 1 and FIG. 2, a semiconductor device 1 includes a semiconductor substrate 10, a circuit layer 20, and a first resin body 30.

The semiconductor substrate 10 has a first main surface 10a and a second main surface 10b opposite to each other in the thickness direction T. The first main surface 10a and the second main surface 10b are opposed to each other in the thickness direction T.

In exemplary aspects, examples of the materials of the semiconductor substrate 10 include semiconductors such as silicon (Si), silicon germanium (SiGe), and gallium arsenide (GaAs).

Electric resistivity of the semiconductor substrate 10 is preferably $10^{-5}$ Ω·cm or more and $10^5$ Ω·cm or less.

A size of the semiconductor substrate 10 in the length direction L is preferably 200 μm or more and 600 μm or less.

A size of the semiconductor substrate 10 in the width direction W is preferably 100 μm or more and 300 μm or less.

A size of the semiconductor substrate 10 in the thickness direction T is preferably 100 μm or more and 250 μm or less.

As further shown, the circuit layer 20 is provided on the first main surface 10a of the semiconductor substrate 10. The circuit layer 20 includes an insulation layer 21, a first electrode layer 22, a dielectric layer 23, a second electrode layer 24, a moisture-resistant protection layer 25, a resin protection layer 26, a first outer electrode 27, and a second outer electrode 28. It is noted that in the first exemplary embodiment, the circuit layer 20 is provided on the entire first main surface 10a of the semiconductor substrate 10, but it may be provided on part of the first main surface 10a of the semiconductor substrate 10 in an alternative aspect. In that case, it is preferable that the circuit layer 20 be provided at a center position on the first main surface 10a of the semiconductor substrate 10, and the circuit layer 20 be provided at a position where a center axis of the semiconductor substrate 10 and a center axis of the circuit layer 20 substantially coincide with each other.

A size of the circuit layer 20 in the thickness direction T is preferably 5 μm or more and 70 μm or less. The size of the circuit layer 20 in the thickness direction T is determined by a size from a surface of the insulation layer 21 on a side of the semiconductor substrate 10 to a surface positioned farthest on a side opposite from the semiconductor substrate 10 among outermost surfaces of the first outer electrode 27 and the second outer electrode 28.

The insulation layer 21 is provided on the entire first main surface 10a of the semiconductor substrate 10. It is noted that the insulation layer 21 can be provided on part of the first main surface 10a of the semiconductor substrate 10, but needs to be larger than the first electrode layer 22 and needs to be provided in a region overlapping the first electrode layer 22 in the exemplary aspect. The insulation layer 21 can also be provided on part of the first main surface 10a of the semiconductor substrate 10 as follows, for example. An insulation layer is formed on the entire first main surface 10a of the semiconductor substrate 10 by oxidizing the first main surface 10a of the semiconductor substrate 10 with a thermal oxidization method, or by forming a film with a sputtering method or a chemical vapor deposition (CVD) method. Then, part of the insulation layer is removed with an etching method.

Examples of the materials of the insulation layer 21 include silicon oxide (SiO, $SiO_2$), silicon nitride (SiN), aluminum oxide ($Al_2O_3$), hafnium oxide ($HfO_2$), tantalum oxide ($Ta_2O_5$), and zirconium oxide ($ZrO_2$).

Moreover, the insulation layer 21 can have a single-layer structure or a multi-layer structure including a plurality of layers made of the materials described above.

A size of the insulation layer 21 in the thickness direction T is preferably 0.5 µm or more and 3 µm or less.

The first electrode layer 22 is provided to the circuit layer 20 on the side of the semiconductor substrate 10, here, on a surface of the insulation layer 21 on the side opposite from the semiconductor substrate 10. Further, the first electrode layer 22 is provided up to a position separated from an end portion of the semiconductor substrate 10. More specifically, an end portion of the first electrode layer 22 is positioned at an inner side portion than the end portion of the semiconductor substrate 10. In the plan view as illustrated in FIG. 1, a distance between the end portion of the first electrode layer 22 and the end portion of the semiconductor substrate 10 is preferably 5 µm or more and 30 µm or less. It is also noted that the end portion of the first electrode layer 22 may be provided on the surface of the insulation layer 21 up to the end portion of the semiconductor substrate 10.

Examples of the materials of the first electrode layer 22 include metals such as aluminum (Al), silicon (Si), copper (Cu), silver (Ag), gold (Au), nickel (Ni), chromium (Cr), and titanium (Ti). Moreover, the material of the first electrode layer 22 may be an alloy containing at least one of the metals described above, and specific examples thereof include an aluminum-silicon alloy (AlSi), an aluminum-copper alloy (AlCu), and an aluminum-silicon-copper alloy (AlSiCu).

The first electrode layer 22 may have a single-layer structure or a multi-layer structure including a plurality of conductive layers made of the materials described above.

A size of the first electrode layer 22 in the thickness direction T is preferably 0.3 µm or more and 10 µm or less, and more preferably 0.5 µm or more and 5 µm or less.

As further shown, the dielectric layer 23 is provided between the first electrode layer 22 and the second electrode layer 24 in the thickness direction T, here, in a direction orthogonal to the first main surface 10a of the semiconductor substrate 10. Further, the dielectric layer 23 is provided to cover a portion of the first electrode layer 22 excluding an opening, and the dielectric layer 23 also has an end portion provided on the surface of the insulation layer 21 from the end portion of the first electrode layer 22 to the end portion of the semiconductor substrate 10.

Examples of the materials of the dielectric layer 23 include silicon nitride (SiN), silicon oxide (SiO, $SiO_2$), aluminum oxide ($Al_2O_3$), hafnium oxide ($HfO_2$), tantalum oxide ($Ta_2O_5$), and zirconium oxide ($ZrO_2$). In particular, the dielectric layer 23 preferably contains at least either of silicon nitride or silicon oxide.

A size of the dielectric layer 23 in the thickness direction T is preferably 0.02 µm or more and 2 µm or less.

The second electrode layer 24 is provided to face the first electrode layer 22. More specifically, the second electrode layer 24 is provided on a surface of the dielectric layer 23 on the side opposite from the semiconductor substrate 10, and faces the first electrode layer 22 with the dielectric layer 23 interposed therebetween.

Examples of the materials of the second electrode layer 24 include metals such as aluminum (Al), silicon (Si), copper (Cu), silver (Ag), gold (Au), nickel (Ni), chromium (Cr), and titanium (Ti). Moreover, the material of the second electrode layer 24 may be an alloy containing at least one of the metals described above, and specific examples thereof include an aluminum-silicon alloy (AlSi), an aluminum-copper alloy (AlCu), and an aluminum-silicon-copper alloy (AlSiCu).

The second electrode layer 24 may have a single-layer structure or a multi-layer structure including a plurality of conductive layers made of the materials described above in exemplary aspects.

A size of the second electrode layer 24 in the thickness direction T is preferably 0.3 µm or more and 10 µm or less, and more preferably 0.5 µm or more and 5 µm or less.

In the semiconductor device 1, the first electrode layer 22, the dielectric layer 23, and the second electrode layer 24 form a capacitor element. More specifically, capacitance of the capacitor element is formed in a region where the first electrode layer 22, the dielectric layer 23, and the second electrode layer 24 overlap each other.

The moisture-resistant protection layer 25 is provided to cover a portion of the dielectric layer 23 and the second electrode layer 24 excluding the opening. Since the moisture-resistant protection layer 25 is provided, the moisture resistance of the capacitor element, particularly of the dielectric layer 23, is enhanced.

Examples of the materials of the moisture-resistant protection layer 25 include silicon-nitride (SiN) and silicon-oxide ($SiO_2$).

A size of the moisture-resistant protection layer 25 in the thickness direction T is preferably 0.5 µm or more and 3 µm or less.

The resin protection layer 26 is provided between the second electrode layer 24 and the first resin body 30 in the thickness direction T, here, is provided on a surface of the moisture-resistant protection layer 25 on the side opposite from the semiconductor substrate 10. Further, an end portion of the resin protection layer 26 is provided to extend from the first resin body 30 to the end portion of the semiconductor substrate 10. The resin protection layer 26 has an opening at a position overlapping openings of the dielectric layer 23 and the moisture-resistant protection layer 25 (i.e., openings overlapping the first electrode layer 22) and an opening at a position overlapping an opening of the moisture-resistant protection layer 25 (i.e., an opening overlapping the second electrode layer 24). Since the resin protection layer 26 is provided, the capacitor element, particularly the dielectric layer 23, is sufficiently protected from moisture.

Examples of the materials of the resin protection layer 26 include resins such as a polyimide resin, a polybenzoxazole resin, a benzocyclobutene resin, and a resin in a solder resist.

A size of the resin protection layer 26 in the thickness direction T is preferably 1 μm or more and 20 μm or less.

As further shown in FIG. 2, the first outer electrode 27 is electrically connected to the first electrode layer 22. More specifically, the openings respectively provided to the dielectric layer 23, the moisture-resistant protection layer 25, and the resin protection layer 26 communicate with each other to extend in the thickness direction T, and the first outer electrode 27 is electrically connected to the first electrode layer 22 through the openings. Further, the first outer electrode 27 is separated from the second electrode layer 24 on a plane in the length direction L and the width direction W, and thus, the first outer electrode 27 is not electrically connected to the second electrode layer 24. Furthermore, the first outer electrode 27 extends to a surface of the circuit layer 20 on the side opposite from the semiconductor substrate 10, and is separated from the second outer electrode 28. That is, the first outer electrode 27 is positioned on the first electrode layer 22 on the side opposite from the semiconductor substrate 10.

The first outer electrode 27 may have a single-layer structure or a multi-layer structure.

In a case that the first outer electrode 27 has a single-layer structure, examples of the materials thereof include metals such as gold (Au), silver (Ag), copper (Cu), palladium (Pd), nickel (Ni), titanium (Ti), aluminum (Al), and an alloy containing at least one of these metals.

In a case that the first outer electrode 27 has a multi-layer structure, the first outer electrode 27 may include a seed layer 29a, a first plating layer 29b, and a second plating layer 29c in order from the side of the semiconductor substrate 10 as illustrated in FIG. 2.

Examples of the seed layer 29a of the first outer electrode 27 include a multilayer body (Ti/Cu) of a conductive layer made of titanium (Ti) and a conductive layer made of copper (Cu).

Examples of the materials of the first plating layer 29b of the first outer electrode 27 include Ni (nickel).

Examples of the materials of the second plating layer 29c of the first outer electrode 27 include gold (Au) and tin (Sn).

In addition, the second outer electrode 28 is electrically connected to the second electrode layer 24. More specifically, the openings respectively provided to the moisture-resistant protection layer 25 and the resin protection layer 26 communicate with each other to extend in the thickness direction T, and the second outer electrode 28 is electrically connected to the second electrode layer 24 through the openings. Further, the second outer electrode 28 is separated from the first electrode layer 22 on a plane in the length direction L and the thickness direction T, and thus, the second outer electrode 28 is not electrically connected to the first electrode layer 22. Furthermore, the second outer electrode 28 extends to the surface of the circuit layer 20 on the side opposite from the semiconductor substrate 10, and is separated from the first outer electrode 27. That is, the second outer electrode 28 is positioned on the second electrode layer 24 on the side opposite from the semiconductor substrate 10.

The second outer electrode 28 may have a single-layer structure or a multi-layer structure.

In a case that the second outer electrode 28 has a single-layer structure, examples of the materials thereof include metals such as gold (Au), silver (Ag), copper (Cu), palladium (Pd), nickel (Ni), titanium (Ti), aluminum (Al), and an alloy containing at least one of these metals.

In a case that the second outer electrode 28 has a multi-layer structure, the second outer electrode 28 may include the seed layer 29a, the first plating layer 29b, and the second plating layer 29c in order from the side of the semiconductor substrate 10 as illustrated in FIG. 2.

Examples of the seed layer 29a of the second outer electrode 28 include a multilayer body (Ti/Cu) of a conductive layer made of titanium (Ti) and a conductive layer made of copper (Cu).

Examples of the materials of the first plating layer 29b of the second outer electrode 28 include Ni (nickel).

Examples of the materials of the second plating layer 29c of the second outer electrode 28 include gold (Au) and tin (Sn).

It is noted that the material of the first outer electrode 27 and the material of the second outer electrode 28 may be the same as each other or may be different from each other.

In addition, the first resin body 30 is provided on the surface of the circuit layer 20 on the side opposite from the semiconductor substrate 10. Further, the first resin body 30 is provided between the first outer electrode 27 and the second outer electrode 28 in a plan view as illustrated in FIG. 1. More specifically, in the length direction L, the first resin body 30 is provided between a normal line extending in the width direction W from an end portion of the first outer electrode 27 on a side of the second outer electrode 28, and a normal line extending in the width direction W from an end portion of the second outer electrode 28 on a side of the first outer electrode 27.

In sectional view as illustrated in FIG. 2, a tip end of the first resin body 30 on the side opposite from the semiconductor substrate 10 is positioned higher (in the thickness direction T) than tip ends of the first outer electrode 27 and the second outer electrode 28 on the side opposite from the semiconductor substrate 10. More specifically, in sectional view as illustrated in FIG. 2, the tip end of the first resin body 30 on the side opposite from the semiconductor substrate 10 is positioned farther on the side opposite from the semiconductor substrate 10, relative to a line segment (horizontal dotted line in FIG. 2) connecting the tip ends of the first outer electrode 27 and the second outer electrode 28 on the side opposite from the semiconductor substrate 10.

In FIG. 2, the outermost surface of the first outer electrode 27 is uneven, and in this case, a portion positioned farthest, on the side opposite from the semiconductor substrate 10, in the outermost surface of the first outer electrode 27 in the thickness direction T is determined as the tip end of the first outer electrode 27 on the side opposite from the semiconductor substrate 10. The same applies to the second outer electrode 28.

Here, as described above, since the first electrode layer 22 is provided up to the position separated from the end portion of the semiconductor substrate 10, an end portion (e.g., a peripheral edge portion) of the circuit layer 20 tends to be lowered toward the side of the semiconductor substrate 10 relative to a center portion of the circuit layer 20. It is noted that, in sectional view as illustrated in FIG. 2, although the resin protection layer 26 is provided on the end portion of the semiconductor substrate 10, the first electrode layer 22 and the second electrode layer 24 do not present below the resin protection layer 26. Consequently, in an actual case, a thickness of the resin protection layer 26 is unlikely to increase. This also tends to lower the end portion (e.g., a peripheral edge portion) of the circuit layer 20 toward the side of the semiconductor substrate 10 relative to the center portion of the circuit layer 20. Consequently, in the first outer electrode 27 and the second outer electrode 28, the center portion side of the circuit layer 20 tends to be higher than the end portion side. Whereas, the first resin body 30 is provided between the first outer electrode 27 and the second outer electrode 28, that is, in the vicinity of the center portion of the circuit layer 20 instead of being provided at the end portion thereof in the plan view as illustrated in FIG. 1. Further, as described above, in sectional view as illustrated in FIG. 2, the tip end of the first resin body 30 on the side opposite from the semiconductor substrate 10 is positioned higher than the tip ends of the first outer electrode 27 and the second outer electrode 28 on the side opposite from the semiconductor substrate 10, i.e., in the thickness direction T. Accordingly, even in a state that the end portion of the circuit layer 20 is lowered toward the side of the semiconductor substrate 10 relative to the center portion of the circuit layer 20, the first resin body 30 protrudes from the circuit layer 20.

Since the first resin body 30 protrudes from the circuit layer 20, when the semiconductor device 1 is mounted on a wiring substrate, for example, the first resin body 30 comes into contact with a side of the wiring substrate (such as an upper surface of the wiring substrate, a land, solder, for example) before the first outer electrode 27 and the second outer electrode 28. Consequently, a load is applied to the first resin body 30, while a load applied to the first outer electrode 27 and the second outer electrode 28 is suppressed. As a result, a load to be transmitted to the capacitor element via the first outer electrode 27 and the second outer electrode 28 is suppressed, and thus breakage of the capacitor element, particularly of the dielectric layer 23, is also suppressed. Such an effect is similarly obtained when the semiconductor device 1 is placed on a flat plate with a side of the circuit layer 20 facing the flat plate.

In the thickness direction T, a protruding size of the first resin body 30 from the circuit layer 20 is preferably 50 μm or less in an exemplary aspect.

Further, in the plan view as illustrated in FIG. 1, the first resin body 30 is provided at at least three positions (e.g., three positions in FIG. 1) surrounding a center of the semiconductor substrate 10. Since the first resin body 30 is provided as described above, when the semiconductor device 1 is mounted on a wiring substrate, for example, the first resin body 30 bears a load and the semiconductor substrate 10 and the circuit layer 20 can stably be held on the wiring substrate. Such an effect is similarly obtained when the semiconductor device 1 is placed on a flat plate with the side of the circuit layer 20 facing the flat plate.

In an exemplary aspect, indentation elastic modulus of the first resin body 30 is preferably lower than indentation elastic modulus of the dielectric layer 23. In this case, since the flexibility of the first resin body 30 is higher than the flexibility of the dielectric layer 23, it is easy for the first resin body 30 to bear a load, and a load applied to the capacitor element, particularly to the dielectric layer 23, is sufficiently suppressed. The indentation elastic modulus of the first resin body 30 is preferably 20 GPa or less.

The indentation elastic modulus is measured with a nanoindentation method, for example.

Moreover, in an exemplary aspect, Young's modulus of the first resin body 30 is preferably 20 GPa or less. In this case, since the flexibility of the first resin body 30 becomes sufficiently high, it is easy for the first resin body 30 to bear a load, and a load applied to the capacitor element is sufficiently suppressed. Further, the Young's modulus of the first resin body 30 is more preferably 0.5 GPa or more and 20 GPa or less.

Young's modulus is measured with a tensile test method, for example.

In an exemplary aspect, the first resin body 30 preferably contains at least one resin selected from the group consisting of a resin in a solder resist, polyimide, polyimideamide, and an epoxy resin.

Moreover, the first resin body 30 is preferably a cured product of a photosensitive resin.

The semiconductor device 1 illustrated in FIG. 1 and FIG. 2 is manufactured with the following method, for example. FIGS. 3-13 are schematic sectional views for describing an example of a method for manufacturing the semiconductor device of the first exemplary embodiment.

<Formation of Insulation Layer>

Figure 3:
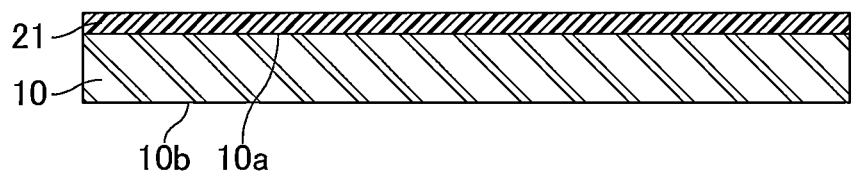
FIG. 3 is a schematic sectional view for describing an example of a method for manufacturing the semiconductor device of the first exemplary embodiment.

As illustrated in FIG. 3, the insulation layer 21 is formed on the first main surface 10a of the semiconductor substrate 10 with a thermal oxidization method, a sputtering method, or a chemical vapor deposition method, for example.

<Formation of First Electrode Layer>

Figure 4:
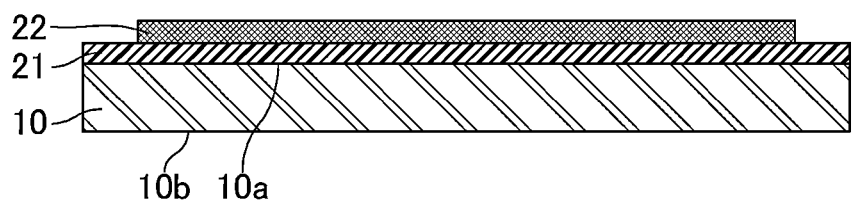
FIG. 4 is a schematic sectional view for describing an example of a method for manufacturing the semiconductor device of the first exemplary embodiment.

A conductive layer made of the material of the first electrode layer 22 is formed on the surface of the insulation layer 21 on the side opposite from the semiconductor substrate 10 with a sputtering method, for example. Thereafter, the first electrode layer 22 in FIG. 4 is formed by patterning the conductive layer with a combination of a photolithography method and an etching method. More specifically, the first electrode layer 22 is formed up to the position separated from the end portion of the semiconductor substrate 10.

<Formation of Dielectric Layer>

Figure 5:
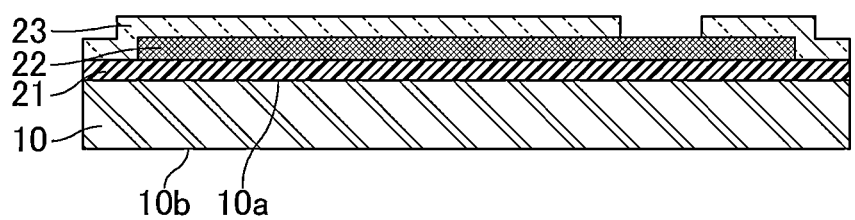
FIG. 5 is a schematic sectional view for describing an example of a method for manufacturing the semiconductor device of the first exemplary embodiment.

A layer made of a material of the dielectric layer 23 is formed to cover the first electrode layer 22 with a sputtering method or a chemical vapor deposition method, for example. Thereafter, the dielectric layer 23 in FIG. 5 is formed by patterning the layer with a combination of a photolithography method and an etching method, for example. More specifically, the dielectric layer 23 is formed such that an opening to expose part of the first electrode layer 22 is provided.

<Formation of Second Electrode Layer>

Figure 6:
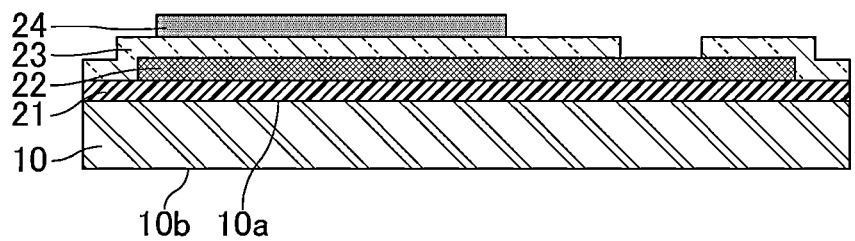
FIG. 6 is a schematic sectional view for describing an example of a method for manufacturing the semiconductor device of the first exemplary embodiment.

A conductive layer made of the material of the second electrode layer 24 is formed on a surface of a structural body illustrated in FIG. 5 on the side opposite from the semiconductor substrate 10 with a sputtering method, for example. Thereafter, the second electrode layer 24 in FIG. 6 is formed by patterning the conductive layer with a combination of a photolithography method and an etching method, for example. More specifically, the second electrode layer 24 is formed to face the first electrode layer 22 with the dielectric layer 23 interposed therebetween.

<Formation of Moisture-Resistant Protection Layer>

Figure 7:
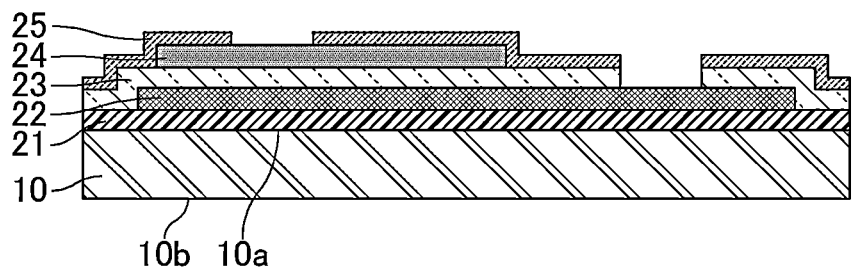
FIG. 7 is a schematic sectional view for describing an example of a method for manufacturing the semiconductor device of the first exemplary embodiment.

A layer made of the material of the moisture-resistant protection layer 25 is formed on a surface of a structural body illustrated in FIG. 6 on the side opposite from the semiconductor substrate 10 with a chemical vapor deposition method, for example. Thereafter, the moisture-resistant protection layer 25 in FIG. 7 is formed by patterning the layer with a combination of a photolithography method and an etching method, for example. More specifically, the moisture-resistant protection layer 25 is formed such that openings are respectively provided at a position overlapping the opening of the dielectric layer 23 for exposing part of the first electrode layer 22, and a position for exposing part of the second electrode layer 24.

<Formation of Resin Protection Layer>

Figure 8:
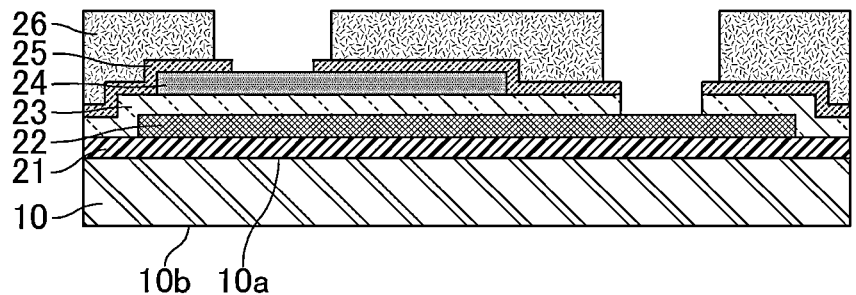
FIG. 8 is a schematic sectional view for describing an example of a method for manufacturing the semiconductor device of the first exemplary embodiment.

A layer made of the material of the resin protection layer 26 is formed on a surface of a structural body illustrated in FIG. 7 on the side opposite from the semiconductor substrate 10 with a spin coating method, for example. Thereafter, the resin protection layer 26 in FIG. 8 is formed by patterning the layer with only a photolithography method in a case that the material of the resin protection layer 26 is photosensitive, or by patterning the layer with a combination of a photolithography method and an etching method in a case that the constituent material of the resin protection layer 26 is non-photosensitive, for example. More specifically, the resin protection layer 26 is formed such that openings are respectively provided at a position overlapping the openings of the dielectric layer 23 and the moisture-resistant protection layer 25 for exposing part of the first electrode layer 22 and at a position overlapping the opening of the moisture-resistant protection layer 25 for exposing part of the second electrode layer 24.

<Formation of Outer Electrode>

Figure 9:
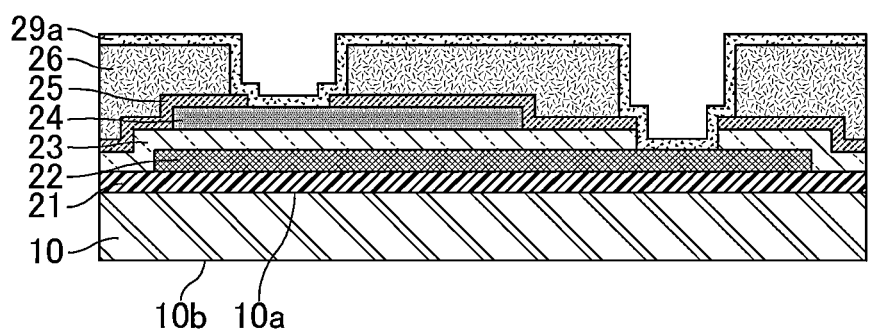
FIG. 9 is a schematic sectional view for describing an example of a method for manufacturing the semiconductor device of the first exemplary embodiment.
Figure 10:
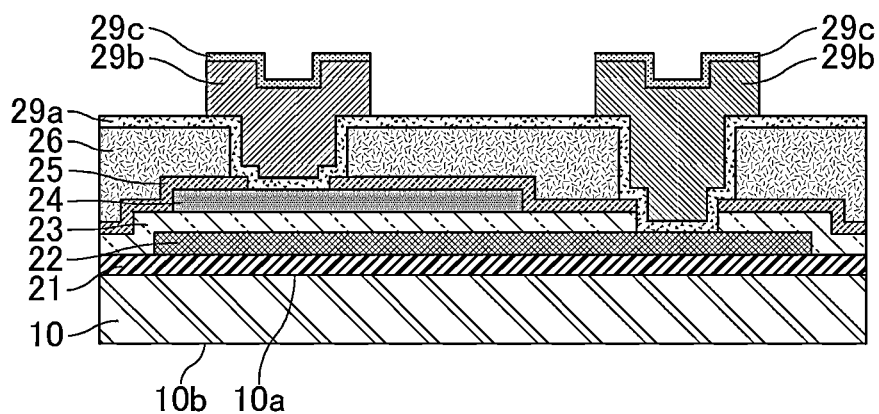
FIG. 10 is a schematic sectional view for describing an example of a method for manufacturing the semiconductor device of the first exemplary embodiment.
Figure 11:
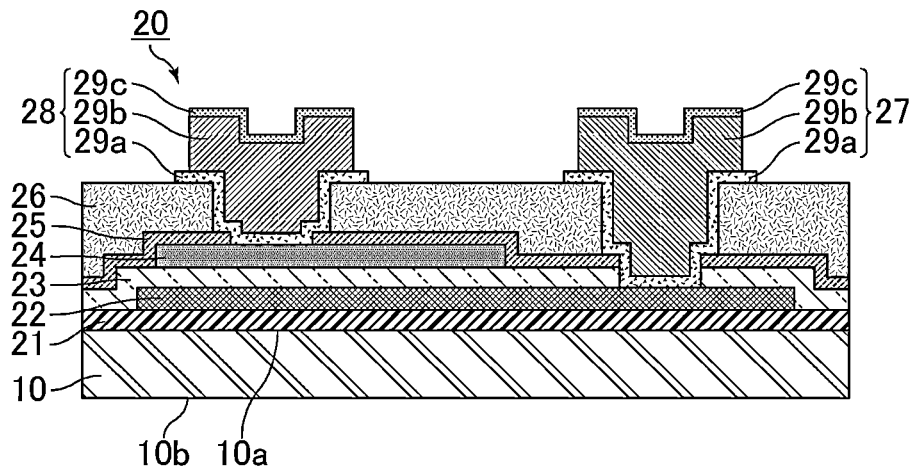
FIG. 11 is a schematic sectional view for describing an example of a method for manufacturing the semiconductor device of the first exemplary embodiment.

As illustrated in FIG. 9, the seed layer 29a is formed on a surface of a structural body illustrated in FIG. 8 on the side opposite from the semiconductor substrate 10. Then, the first plating layer 29b and the second plating layer 29c in FIG. 10 are sequentially formed by combining a plating process and a photolithography method. Thereafter, as illustrated in FIG. 11, part of the seed layer 29a is removed with an etching method, for example. Thus, the first outer electrode 27 and the second outer electrode 28 in FIG. 11 are formed. More specifically, the first outer electrode 27 is formed to be electrically connected to the first electrode layer 22 through the openings respectively provided in the dielectric layer 23, the moisture-resistant protection layer 25, and the resin protection layer 26. Further, the second outer electrode 28 is formed to be electrically connected to the second electrode layer 24 through the openings respectively provided in the moisture-resistant protection layer 25 and the resin protection layer 26.

Thus, the circuit layer 20 in FIG. 11 is formed on the first main surface 10a of the semiconductor substrate 10. As further shown, the first outer electrode 27 extends to the surface of the circuit layer 20 on the side opposite from the semiconductor substrate 10, and is separated from the second outer electrode 28. Furthermore, the second outer electrode 28 extends to the surface of the circuit layer 20 on the side opposite from the semiconductor substrate 10, and is separated from the first outer electrode 27.

<Formation of First Resin Body>

Figure 12:
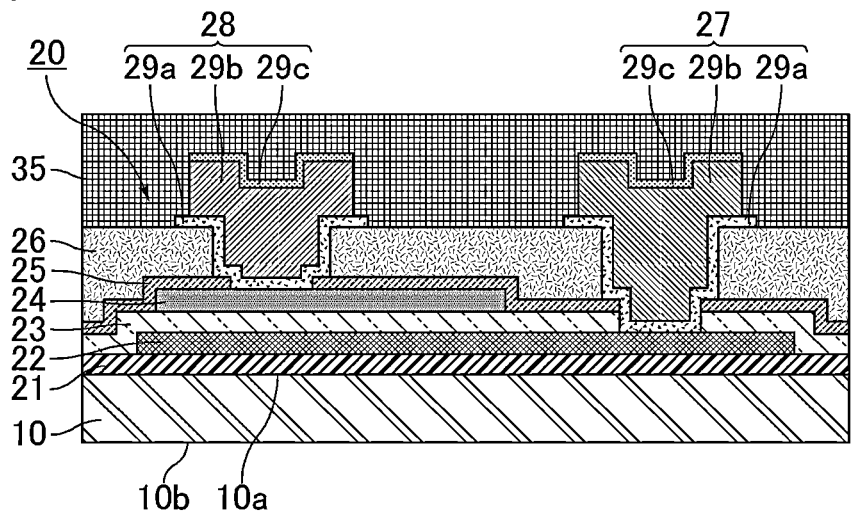
FIG. 12 is a schematic sectional view for describing an example of a method for manufacturing the semiconductor device of the first exemplary embodiment.

As illustrated in FIG. 12, a photosensitive resin film 35 is formed on the surface of the circuit layer 20 on the side opposite from the semiconductor substrate 10. Then, patterning the photosensitive resin film 35 is performed with a photolithography method to form the first resin body 30 in FIG. 13 on the surface of the circuit layer 20 on the side opposite from the semiconductor substrate 10. More specifically, the first resin body 30 is formed between the first outer electrode 27 and the second outer electrode 28 in the plan view, and is formed such that the tip end of the first resin body 30 on the side opposite from the semiconductor substrate 10 is positioned higher (relative to the thickness direction T) than the tip ends of the first outer electrode 27 and the second outer electrode 28 on the side opposite from the semiconductor substrate 10 in sectional view. Further, the first resin body 30 is formed to be provided at at least three positions surrounding the center of the semiconductor substrate 10 in the plan view.

Figure 13:
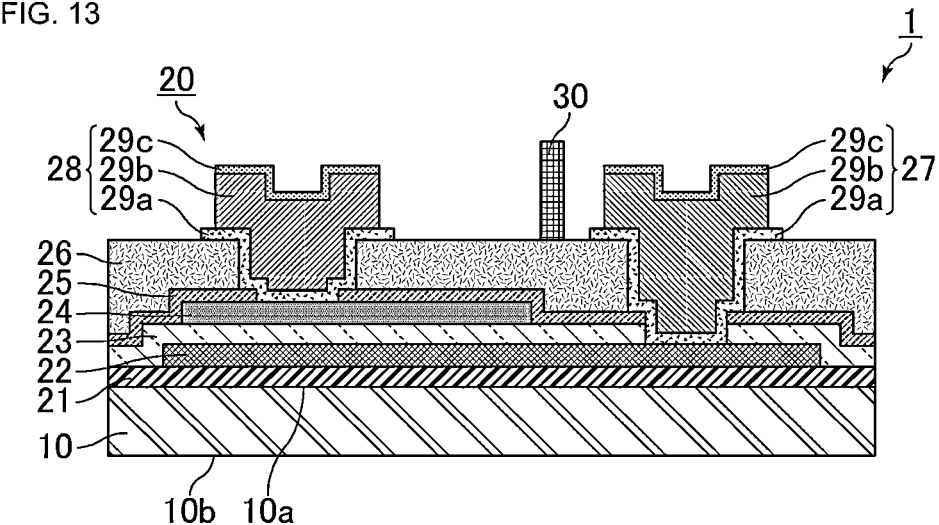
FIG. 13 is a schematic sectional view for describing an example of a method for manufacturing the semiconductor device of the first exemplary embodiment.

Thus, the semiconductor device 1 in FIG. 13 is manufactured.

Hereinabove, a case of manufacturing one semiconductor device 1 has been described. However, it is noted that a plurality of semiconductor devices 1 may be manufactured at the same time by forming a plurality of circuit layers 20 on the first main surface 10a of the same semiconductor substrate 10, and then cutting the semiconductor substrate 10 into individual pieces with, for example, a dicing machine.

The module of the present disclosure includes the semiconductor device described herein and a wiring substrate having a first land electrically connected to the first outer electrode and a second land electrically connected to the second outer electrode. Hereinafter, the module including the semiconductor device of the first exemplary embodiment will be described as a module of the first exemplary embodiment.

Figure 14:
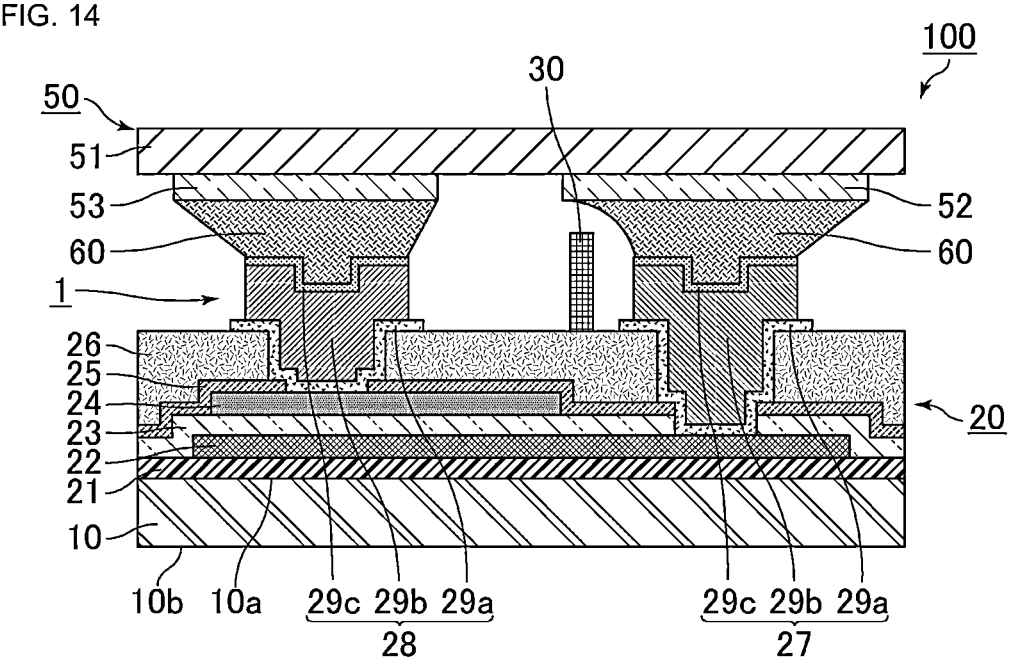
FIG. 14 is a schematic sectional view of a module of the first exemplary embodiment.

FIG. 14 is a schematic sectional view of the module of the first exemplary embodiment.

As illustrated in FIG. 14, a module 100 includes the semiconductor device 1 and a wiring substrate 50. More specifically, the module 100 is obtained by mounting the semiconductor device 1 on the wiring substrate 50.

As shown, the wiring substrate 50 includes a substrate 51, a first land 52, and a second land 53.

Various wires are provided on the substrate 51. Moreover, the various wires of the substrate 51 are independently connected to the first land 52 and the second land 53.

The first land 52 is provided on a surface of the substrate 51, and is electrically connected to the first outer electrode 27. More specifically, the first land 52 is electrically connected to the first outer electrode 27 with solder 60 interposed therebetween.

In exemplary aspects, examples of the materials of the first land 52 include metals, such as copper (Cu).

The second land 53 is provided at a position separated from the first land 52 on the surface of the substrate 51, and is electrically connected to the second outer electrode 28. More specifically, the second land 53 is electrically connected to the second outer electrode 28 with the solder 60 interposed therebetween.

Examples of the materials of the second land 53 include metals, such as copper (Cu).

It is noted that in the module 100, the first resin body 30 is not in contact with a side of the wiring substrate 50 (such as the first land 52, the second land 53, and the solder 60, for example). Following mechanisms are thought to be causes of the above, for example.

As a first mechanism, there will be described a case that the semiconductor device 1 is mounted on the wiring substrate 50 in a state with no positional deviation. When the semiconductor device 1 is mounted on the wiring substrate 50 with the solder 60 interposed therebetween, first, the first resin body 30 comes into contact with the solder 60. Thereafter, when a reflow process is performed, the solder 60 entirely spreads out on each of the first land 52 and the second land 53, but the solder 60 avoids the first resin body 30. As a result, the first resin body 30 does not come into contact with the solder 60.

As a second mechanism, there will be described a case that the semiconductor device 1 is mounted on the wiring substrate 50 in a state with positional deviation. In this case, a self-alignment effect occurs during the reflow process, and as a result, the first resin body 30 does not come into contact with the solder 60.

Figure 15:
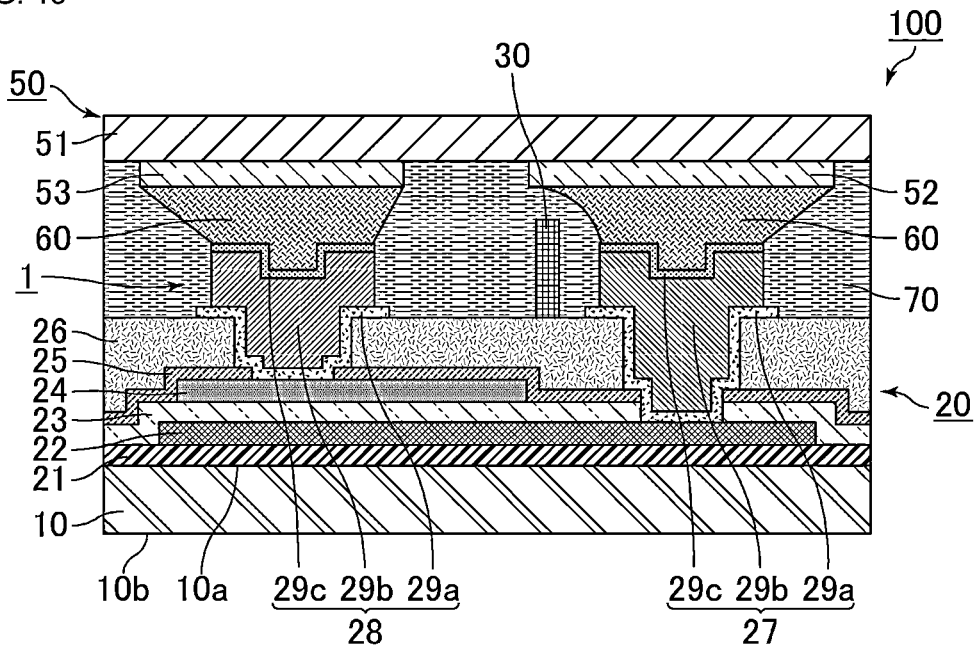
FIG. 15 is a schematic sectional view of the module of the first exemplary embodiment illustrating a state that a mold resin is provided thereto.

In the module 100, as illustrated in FIG. 15, a mold resin 70 may be provided between the wiring substrate 50 and each of the first outer electrode 27 and the second outer electrode 28. FIG. 15 is a schematic sectional view of the module of the first exemplary embodiment illustrating a state that a mold resin is provided thereto.

Second Exemplary Embodiment

In the semiconductor device of the present disclosure, a first resin body may include a wall portion extending in a direction being orthogonal to the thickness direction and intersecting a direction from the second outer electrode toward the first outer electrode. Such an example will be described below as a semiconductor device of a second exemplary embodiment. The semiconductor device of the second exemplary embodiment is the same as the semiconductor device of the first exemplary embodiment except that a configuration of the first resin body is changed.

Figure 16:
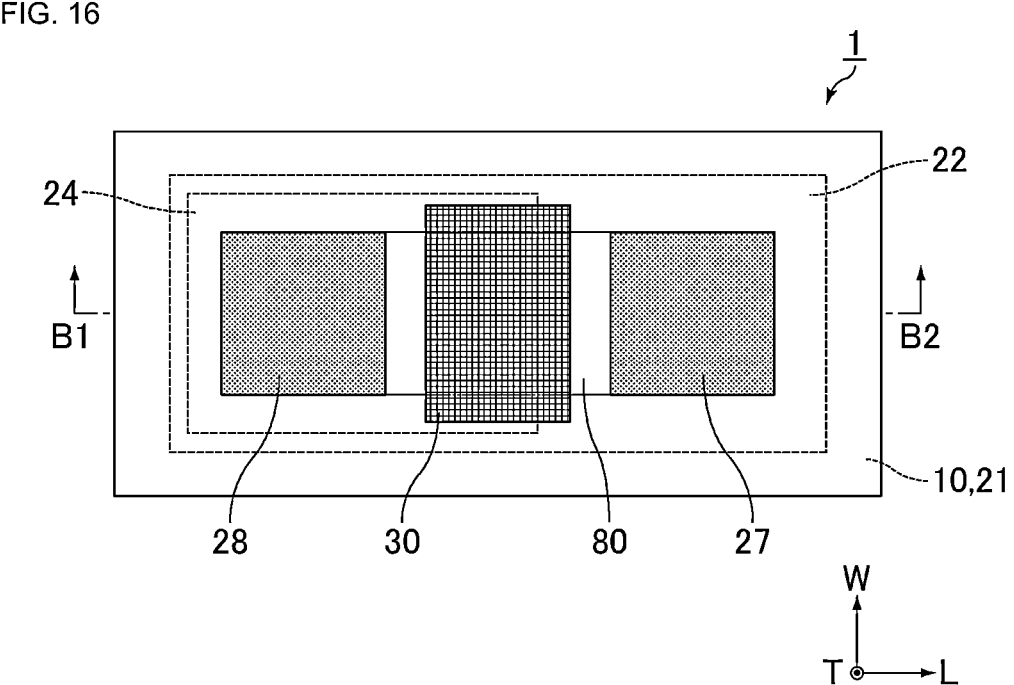
FIG. 16 is a schematic plan view of a semiconductor device of a second exemplary embodiment.
Figure 17:
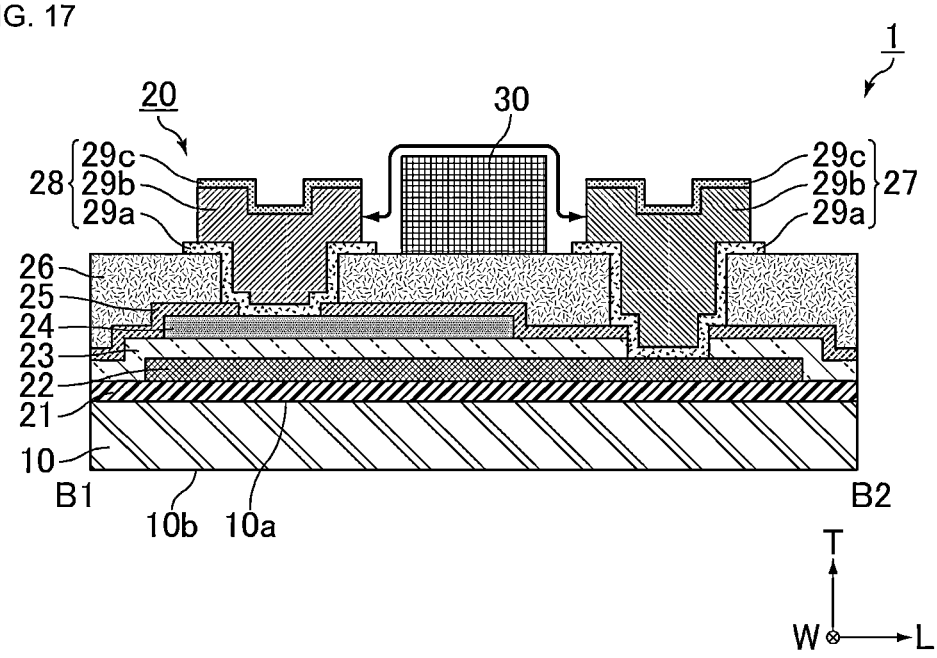
FIG. 17 is a schematic sectional view of a portion corresponding to a line segment B1-B2 in FIG. 16.

FIG. 16 is a schematic plan view of the semiconductor device of the second exemplary embodiment. FIG. 17 is a schematic sectional view of a portion corresponding to a line segment B1-B2 in FIG. 16.

As illustrated in FIG. 16 and FIG. 17, the first resin body 30 includes a wall portion extending in a direction being orthogonal to the thickness direction T and intersecting the direction from the second outer electrode 28 toward the first outer electrode 27, here, that is the length direction L. More specifically, as shown in FIG. 17, for example, the first resin body 30 includes a wall portion extending in a direction orthogonal to both the length direction L and the thickness direction T, that is, extending in the width direction W.

Since the first resin body 30 includes the wall portion described above, a load may more widely be dispersed when the semiconductor device 1 is mounted on a wiring substrate. Consequently, a load applied to the capacitor element, particularly to the dielectric layer 23, is sufficiently suppressed.

In the plan view as illustrated in FIG. 16, both a size in the length direction L and a size in the width direction W of the first resin body 30 are preferably 3 μm or more in an exemplary aspect. When both the size in the length direction L and the size in the width direction W of the first resin body 30 are smaller than 3 μm, when the semiconductor device 1 is mounted on a wiring substrate, there is a possibility that the semiconductor substrate 10 and the circuit layer 20 are not able to be held stably on the wiring substrate while the first resin body 30 bears a load.

From a viewpoint of stably holding the semiconductor substrate 10 and the circuit layer 20 on a wiring substrate with the first resin body 30, in the plan view as illustrated in FIG. 16, the size of the first resin body 30 in the width direction W is preferably larger than the size of each of the first outer electrode 27 and the second outer electrode 28 in the width direction W.

In the plan view as illustrated in FIG. 16, the first resin body 30 has a rectangular shape, but the shape thereof is not particularly limited and may be an elliptical shape, for example.

A module of the second exemplary embodiment is the same as the module of the first exemplary embodiment except for including the semiconductor device of the second exemplary embodiment.

In the plan view as illustrated in FIG. 16, the first resin body 30 extends as a wall portion in a region 80 connecting an end portion of the first outer electrode 27 and an end portion of the second outer electrode 28 facing each other.

With this configuration, when the semiconductor device 1 illustrated in FIG. 16 and FIG. 17 is mounted on a wiring substrate to form a module, even in a case that spread of solder, so-called solder splash occurs, a path through which the solder spreads out becomes longer by the size of the first resin body 30 as illustrated with arrows in FIG. 17. Consequently, a short circuit between the first outer electrode 27 and the second outer electrode 28 due to solder splash may be suppressed.

[First Modification of the Second Exemplary Embodiment]

In the semiconductor device of the second exemplary embodiment, a wall portion may include a first wall portion provided on a side of a first outer electrode, and a second wall portion provided on a side of a second outer electrode and separated from the first wall portion. Such an example will be described below as a semiconductor device of a firth modification of the second exemplary embodiment.

Figure 18:
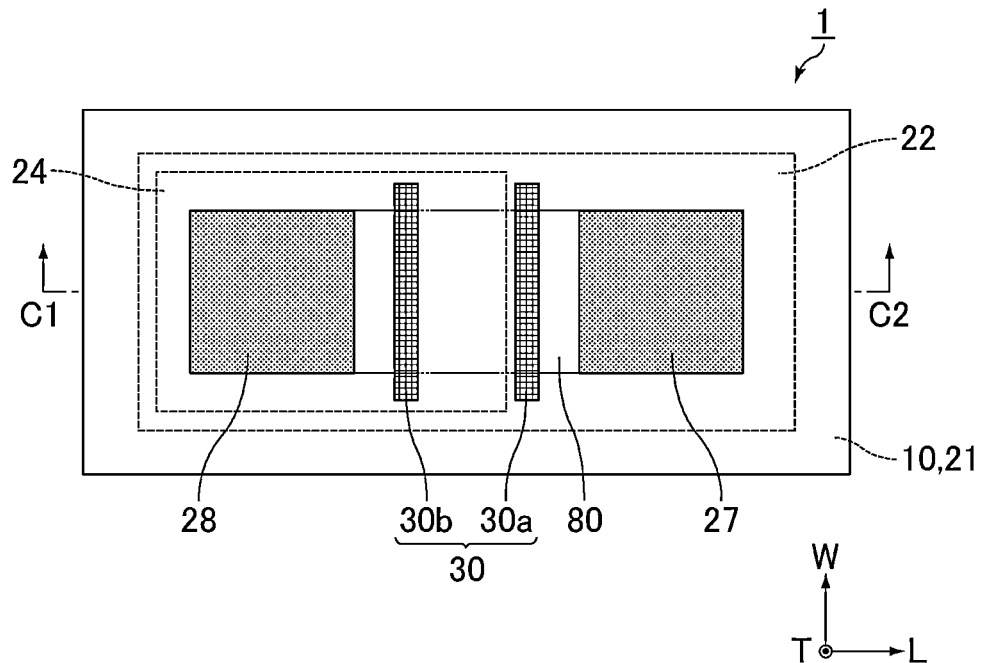
FIG. 18 is a schematic plan view of a semiconductor device of a first modification of the second exemplary embodiment.
Figure 19:
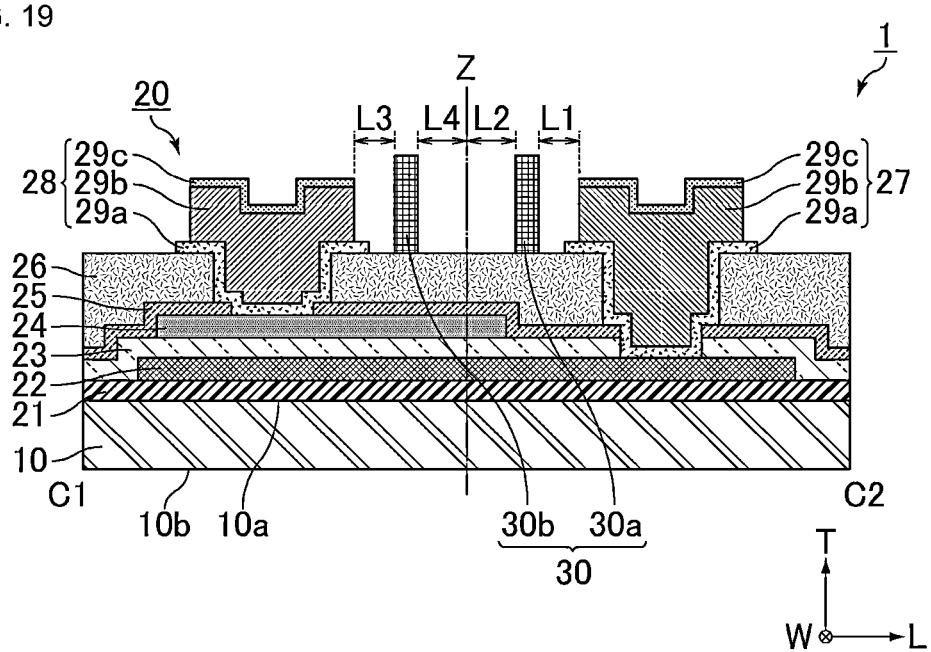
FIG. 19 is a schematic sectional view of a portion corresponding to a line segment C1-C2 in FIG. 18.

In particular, FIG. 18 is a schematic plan view of the semiconductor device of the first modification of the second exemplary embodiment. FIG. 19 is a schematic sectional view of a portion corresponding to a line segment C1-C2 in FIG. 18.

As illustrated in FIG. 18 and FIG. 19, the first resin body 30 includes, as wall portions, a first wall portion 30a provided on a side of the first outer electrode 27, and a second wall portion 30b provided on a side of the second outer electrode 28 and separated from the first wall portion 30a.

Since the first resin body 30 includes, as wall portions, the first wall portion 30a and the second wall portion 30b, when the semiconductor device 1 is mounted on a wiring substrate, for example, the semiconductor substrate 10 and the circuit layer 20 may stably be held on the wiring substrate with the first resin body 30. Further, when the semiconductor device 1 is mounted on a wiring substrate, for example, since a load may more widely be dispersed with the first resin body 30, a load applied to the capacitor element, particularly to the dielectric layer 23, is sufficiently suppressed.

In the plan view as illustrated in FIG. 18, in the width direction W, one end of each of the first wall portion 30a and the second wall portion 30b is preferably positioned between one end of the semiconductor substrate 10 and one end of the region 80 connecting the end portion of the first outer electrode 27 and the end portion of the second outer electrode 28 facing each other. In addition, in the width direction W, the other end of each of the first wall portion 30a and the second wall portion 30b is preferably positioned between the other end of the semiconductor substrate 10 and the other end of the region 80 connecting the end portion of the first outer electrode 27 and the end portion of the second outer electrode 28 facing each other. Since the first wall portion 30a and the second wall portion 30b are provided as described above, the semiconductor substrate 10 and the circuit layer 20 are configured to be sufficiently and stably held on a wiring substrate with the first resin body 30.

From a viewpoint of stably holding the semiconductor substrate 10 and the circuit layer 20 on a wiring substrate with the first resin body 30, a size of each of the first wall portion 30a and the second wall portion 30b in the length direction L is preferably 3 μm or more. Further, the size of each of the first wall portion 30a and the second wall portion 30b in the length direction L is preferably less than half a distance between the first outer electrode 27 and the second outer electrode 28 in the length direction L.

From a viewpoint of stably holding the semiconductor substrate 10 and the circuit layer 20 on a wiring substrate with the first resin body 30, a size of each of the first wall portion 30a and the second wall portion 30b in the width direction W is preferably 10 µm or more. Further, the size of each of the first wall portion 30a and the second wall portion 30b in the width direction W is preferably equal to or smaller than a size of the semiconductor substrate 10 in the width direction W.

In the plan view as illustrated in FIG. 18, it is preferable that the first wall portion 30a and the second wall portion 30b be provided parallel to each other. In this case, when the semiconductor device 1 is mounted on a wiring substrate, for example, the semiconductor substrate 10 and the circuit layer 20 are sufficiently and stably held on a wiring substrate with the first resin body 30. In particular, in the length direction L of the semiconductor substrate 10, with the first wall portion 30a being provided on one side of the center thereof and the second wall portion 30b being provided on the other side of the center thereof, the semiconductor substrate 10 and the circuit layer 20 are more stably held on a wiring substrate with the first resin body 30.

Moreover, in an exemplary aspect, a distance L1 between the first wall portion 30a and the first outer electrode 27 is preferably shorter than a distance L2 between the first wall portion 30a and a center position Z between the first outer electrode 27 and the second outer electrode 28; and a distance L3 between the second wall portion 30b and the second outer electrode 28 is preferably shorter than a distance L4 between the second wall portion 30b and the center position Z between the first outer electrode 27 and the second outer electrode 28. In this case, when the semiconductor device 1 is mounted on a wiring substrate, for example, the semiconductor substrate 10 and the circuit layer 20 may sufficiently stably be held on a wiring substrate with the first resin body 30. Further, when the semiconductor device 1 is mounted on a wiring substrate, for example, the semiconductor device 1 is prevented from being bent at three points.

The distances L1, L2, L3, and L4, and the center position Z are determined as follows. First, midpoints between end portions, which face each other, of the first outer electrode 27 and the second outer electrode 28 are determined on five straight lines extending in the length direction L, and a straight line connecting these midpoints is determined as the center position Z. Here, the five straight lines are selected to include: a straight line passing through a position where a distance between the first wall portion 30a and the first outer electrode 27 is maximum, a straight line passing through a position where the distance between the first wall portion 30a and the first outer electrode 27 is minimum, a straight line passing through a position where a distance between the second wall portion 30b and the second outer electrode 28 is maximum, and a straight line passing through a position where the distance between the second wall portion 30b and the second outer electrode 28 is minimum. Next, the distance between the first wall portion 30a and the first outer electrode 27, a distance between the center position Z and the first wall portion 30a, the distance between the second wall portion 30b and the second outer electrode 28, and a distance between the center position Z and the second wall portion 30b are measured on each of the same five straight lines as above. Then, as for each of the distance between the first wall portion 30a and the first outer electrode 27, the distance between the center position Z and the first wall portion 30a, the distance between the second wall portion 30b and the second outer electrode 28, and the distance between the center position Z and the second wall portion 30b, five measured values are averaged and the obtained averaged values are defined as the distances L1, L2, L3, and L4, respectively.

Meanwhile, when the first wall portion 30a and the second wall portion 30b are made of a solder-repellent material, such as a solder resist, and the first wall portion 30a and the second wall portion 30b are respectively in contact with the first outer electrode 27 and the second outer electrode 28, that is, both the distance L1 and the distance L3 are zero, the following may occur. When the semiconductor device 1, more specifically, each of the first outer electrode 27 and the second outer electrode 28 is connected to a land of a wiring substrate with solder interposed therebetween, the solder may be greatly constricted on each of the first outer electrode 27 and the second outer electrode 28 to avoid the first wall portion 30a and the second wall portion 30b. As a result, bonding strength of the solder to each of the first outer electrode 27 and the second outer electrode 28 may be lowered. Further, since the solder is greatly constricted, disconnection in the solder is likely to occur. Furthermore, when the semiconductor device 1 is used in a radio frequency region, an outer peripheral portion of the solder becomes a current path because of a skin effect. With this configuration, the current path becomes long when the solder is greatly constricted, and as a result, equivalent series resistance (ESR) increases and Q factor deteriorates. From a viewpoint of suppressing the problem above, it is preferable that the first wall portion 30a and the first outer electrode 27 be separated from each other, and the second wall portion 30b and the second outer electrode 28 be separated from each other.

A module of the first modification of the second exemplary embodiment is the same as the module of the first exemplary embodiment except for including the semiconductor device of the above described first modification of the second exemplary embodiment.

[Second Modification of the Second Exemplary Embodiment]

In the semiconductor device of the second exemplary embodiment, it is acceptable that a second resin body is provided on a surface of a circuit layer on a side opposite from a semiconductor substrate, and the second resin body includes a first outer peripheral portion provided between an end portion of the semiconductor substrate and a first outer electrode along the end portion of the semiconductor substrate in the plan view; and a second outer peripheral portion provided between the end portion of the semiconductor substrate and a second outer electrode along the end portion of the semiconductor substrate in the plan view. Such an example will be described below as a semiconductor device of a second modification of the second exemplary embodiment. It is also noted that, in the semiconductor device of the second modification of the second exemplary embodiment, a case that a first resin body includes a first wall portion and a second wall portion as wall portions will be exemplified. That is, the semiconductor device of the second modification of the second exemplary embodiment is the same as the semiconductor device of the first modification of the second exemplary embodiment except that the second resin body is provided.

Figure 20:
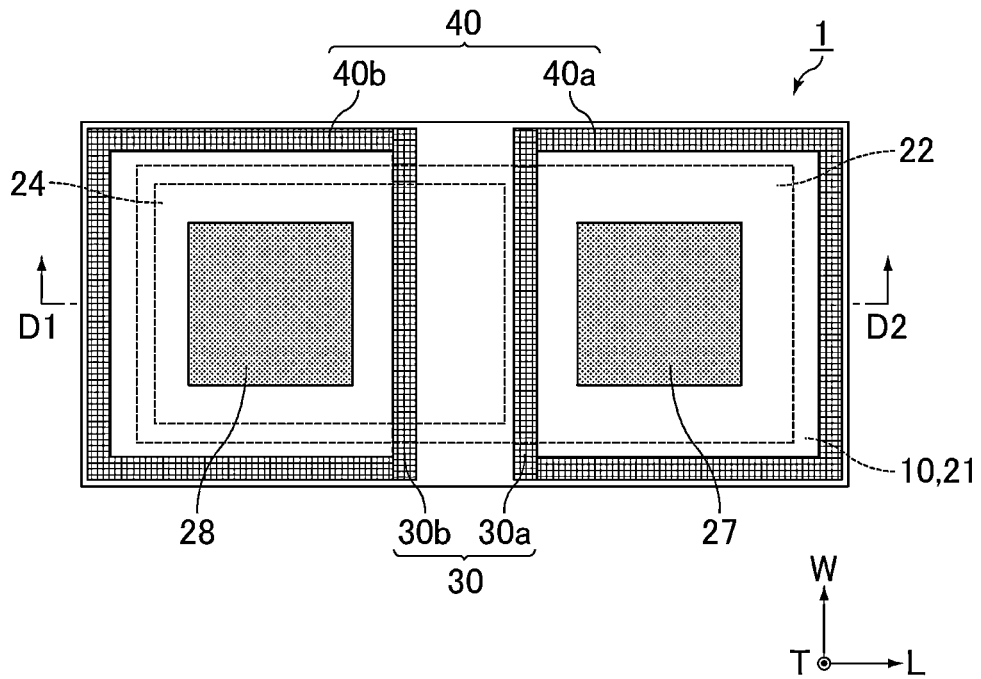
FIG. 20 is a schematic plan view of a semiconductor device of a second modification of the second exemplary embodiment.
Figure 21:
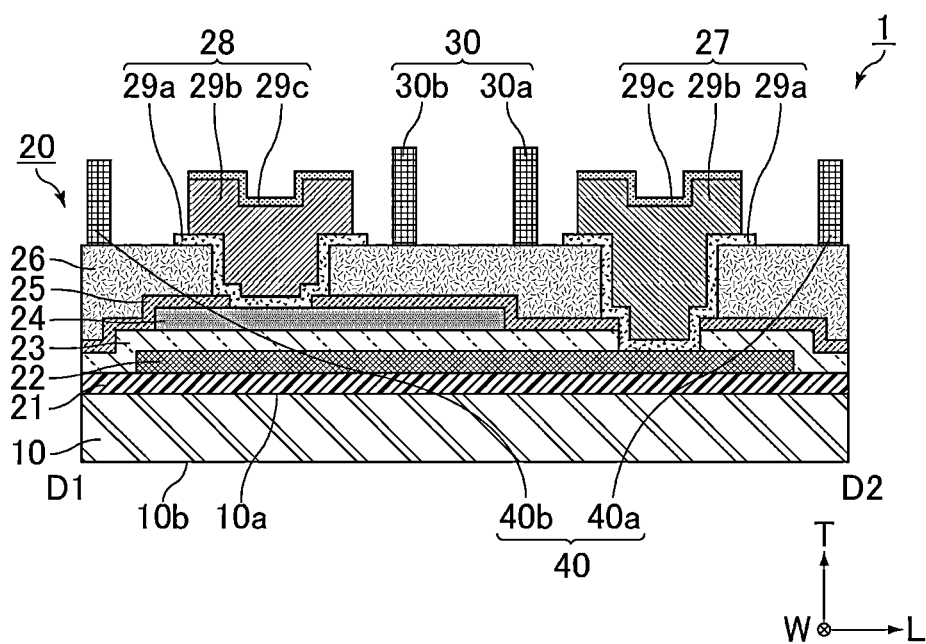
FIG. 21 is a schematic sectional view of a portion corresponding to a line segment D1-D2 in FIG. 20.

FIG. 20 is a schematic plan view of the semiconductor device of the second modification of the second exemplary embodiment. FIG. 21 is a schematic sectional view of a portion corresponding to a line segment D1-D2 in FIG. 20.

As illustrated in FIG. 20 and FIG. 21, a second resin body 40 is provided on the surface of the circuit layer 20 on the side opposite from the semiconductor substrate 10.

The second resin body 40 has a first outer peripheral portion 40a provided between the end portion of the semiconductor substrate 10 and the first outer electrode 27 along the end portion of the semiconductor substrate 10 in the plan view as illustrated in FIG. 20; and a second outer peripheral portion 40b provided between the end portion of the semiconductor substrate 10 and the second outer electrode 28 along the end portion of the semiconductor substrate 10 in the plan view as illustrated in FIG. 20. More specifically, the first outer peripheral portion 40a is provided around the first outer electrode 27 along both ends extending in the length direction L and one end extending in the width direction W of the semiconductor substrate 10. Similarly, the second outer peripheral portion 40b is provided around the second outer electrode 28 along both ends extending in the length direction L and the other end extending in the width direction W of the semiconductor substrate 10.

Since the second resin body 40 having the first outer peripheral portion 40a and the second outer peripheral portion 40b is provided, when the plurality of circuit layers 20 is, for example, formed on the first main surface 10a of the same semiconductor substrate 10 and then the semiconductor substrate 10 is cut with, for example, a dicing machine to be separated into individual pieces, generation of chipping in the semiconductor device 1 may be suppressed because the semiconductor substrate 10 and the second resin body 40 are cut at the same time.

In sectional view as illustrated in FIG. 21, a tip end of the second resin body 40 on the side opposite from the semiconductor substrate 10, here, tip ends of the first outer peripheral portion 40a and the second outer peripheral portion 40b on the side opposite from the semiconductor substrate 10 are preferably positioned lower than the tip end of the first resin body 30 on the side opposite from the semiconductor substrate 10, here, tip ends of the first wall portion 30a and the second wall portion 30b on the side opposite from the semiconductor substrate 10. In this case, when, for example, the semiconductor device 1 is mounted on a wiring substrate, the semiconductor substrate 10 and the circuit layer 20 are configured to be stably held on the wiring substrate with the first resin body 30. As described above, since the first electrode layer 22 is provided up to the position separated from the end portion of the semiconductor substrate 10, the end portion of the circuit layer 20 tends to be lowered toward the side of the semiconductor substrate 10 relative to the center portion of the circuit layer 20. Consequently, the tip end of the second resin body 40 on the side opposite from the semiconductor substrate 10 tends to be positioned lower than the tip end of the first resin body 30 on the side opposite from the semiconductor substrate 10.

In sectional view as illustrated in FIG. 21, it is preferable that the tip end of the second resin body 40 on the side opposite from the semiconductor substrate 10, here, the tip ends of the first outer peripheral portion 40a and the second outer peripheral portion 40b on the side opposite from the semiconductor substrate 10 be higher than the tip ends of the first outer electrode 27 and the second outer electrode 28 on the side opposite from the semiconductor substrate 10. In this case, when the semiconductor device 1 is mounted on a wiring substrate, for example, since a load may more widely be dispersed with the second resin body 40, a load applied to the capacitor element, particularly to the dielectric layer 23, is sufficiently suppressed.

It is also noted that a second resin body having a first outer peripheral portion and a second outer peripheral portion may be provided to the semiconductor device of the first exemplary embodiment.

A module of the second modification of the second exemplary embodiment is the same as the module of the first exemplary embodiment except for including the semiconductor device of the second modification of the second exemplary embodiment.

[Third Modification of the Second Exemplary Embodiment]

In the semiconductor device of the second exemplary embodiment, in sectional view, it is acceptable that a side surface of a wall portion on a side of a first outer electrode and a side surface of the wall portion on a side of a second outer electrode approach each other from a side of the semiconductor substrate toward a side opposite from the semiconductor substrate. Such an example will be described below as a semiconductor device of a third modification of the second exemplary embodiment. It is noted that, in the semiconductor device of third modification of the second exemplary embodiment, a case that a first resin body includes a first wall portion and a second wall portion as wall portions will be exemplified. That is, the semiconductor device of third modification of the second exemplary embodiment is the same as the semiconductor device of the second modification of the second exemplary embodiment except that a shape of the first resin body is changed.

Figure 22:
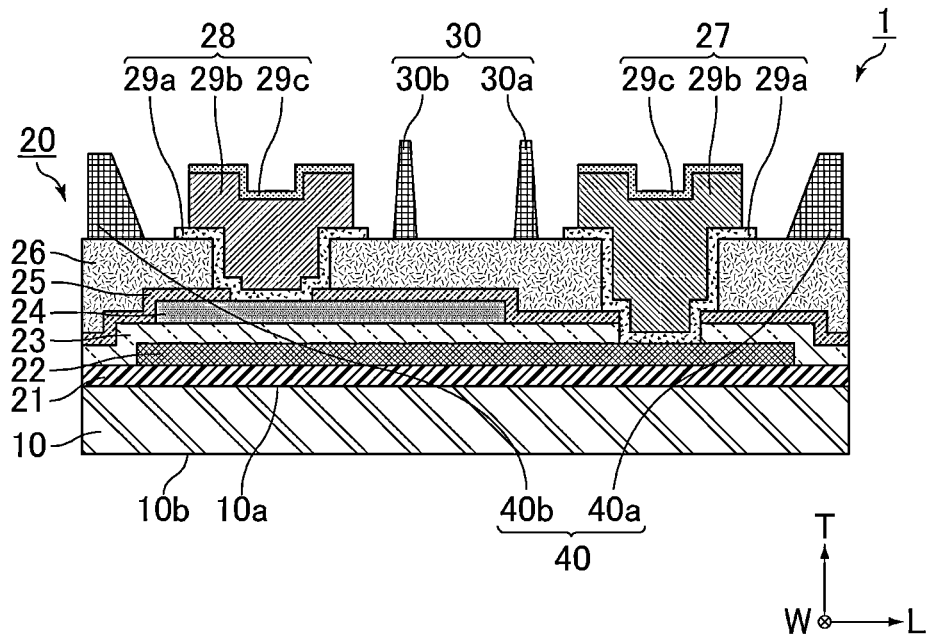
FIG. 22 is a schematic plan view of a semiconductor device of a third modification of the second exemplary embodiment.

FIG. 22 is a schematic plan view of a semiconductor device of the third modification of the second exemplary embodiment.

In sectional view as illustrated in FIG. 22, a side surface of a first wall portion 30a on the side of the first outer electrode 27 and a side surface of the first wall portion 30a on the side of the second outer electrode 28 approach each other from the side of the semiconductor substrate 10 toward the side opposite from the semiconductor substrate 10. Further, in sectional view as illustrated in FIG. 22, a side surface of a second wall portion 30b on the side of the first outer electrode 27 and a side surface of the second wall portion 30b on the side of the second outer electrode 28 approach each other from the side of the semiconductor substrate 10 toward the side opposite from the semiconductor substrate 10. That is, each of sectional shapes of the first wall portion 30a and the second wall portion 30b is a so-called tapered shape in which a width thereof decreases from the side of the semiconductor substrate 10 toward the side opposite from the semiconductor substrate 10. In each of the first wall portion 30a and the second wall portion 30b, the side surface on the side of the first outer electrode 27 and the side surface on the side of the second outer electrode 28 can be a curved surface as long as the side surfaces approach each other from the side of the semiconductor substrate 10 toward the side opposite from the semiconductor substrate 10.

Since the first wall portion 30a and the second wall portion 30b have the shape described above, as compared with the configuration illustrated in FIG. 21, the first wall portion 30a and a region on the first outer electrode 27 are apart from each other, and the second wall portion 30b and a region on the second outer electrode 28 are apart from each other. Consequently, when the semiconductor device 1, more specifically, each of the first outer electrode 27 and the second outer electrode 28 is connected to a land of a wiring substrate with solder interposed therebetween, even in a case that the first wall portion 30a and the second wall portion 30b are made of a solder-repellent material, such as a solder resist, the solder is not greatly constricted on each of the first outer electrode 27 and the second outer electrode 28. That is, the current path formed of the solder connecting each of the first outer electrode 27 and the second outer electrode 28 to the land of the wiring substrate is not narrowed in the middle. As a result, a decrease in bonding strength of the solder to each of the first outer electrode 27 and the second outer electrode 28 is sufficiently suppressed. Further, since the solder is not greatly constricted, disconnection in the solder is less likely to occur. Furthermore, in a case that the semiconductor device 1 is used in a radio frequency region, the outer peripheral portion of the solder becomes a current path because of the skin effect. However, the current path does not become long since the solder is not greatly constricted, and as a result, an increase in equivalent series resistance and deterioration in Q factor are suppressed. From the viewpoint above, in the first wall portion 30*a* and the second wall portion 30*b*, portions protruding as compared with the first outer electrode 27 and the second outer electrode 28 (i.e., portions facing the regions on the first outer electrode 27 and the second outer electrode 28) preferably have the shapes described above.

In order to prevent the solder from being greatly constricted on the first outer electrode 27, it is important to make the first wall portion 30*a* and the region on the first outer electrode 27 apart from each other. Thus, as illustrated in FIG. 22, a distance between the first outer electrode 27 and the side surface of the first wall portion 30*a* on the side of the first outer electrode 27 preferably increases from the side of the semiconductor substrate 10 toward the side opposite from the semiconductor substrate 10. That is, in a case that a first resin body 30 includes a plurality of wall portions, it is preferable that a distance between the first outer electrode 27 and a wall portion provided closest to the side of the first outer electrode 27 among the plurality of wall portions, here, the side surface of the first wall portion 30*a* on the side of the first outer electrode 27 increase from the side of the semiconductor substrate 10 toward the side opposite from the semiconductor substrate 10. It is also noted that, as long as the side surface of the first wall portion 30*a* on the side of the first outer electrode 27 and the side surface of the first wall portion 30*a* on the side of the second outer electrode 28 approach each other from the side of the semiconductor substrate 10 toward the side opposite from the semiconductor substrate 10, a distance between the first outer electrode 27 and the side surface of the first wall portion 30*a* on the side of the second outer electrode 28 may decrease from the side of the semiconductor substrate 10 toward the side opposite from the semiconductor substrate 10, or may be constant. In other words, the distance between the second outer electrode 28 and the side surface of the first wall portion 30*a* on the side of the second outer electrode 28 may increase from the side of the semiconductor substrate 10 toward the side opposite from the semiconductor substrate 10, or may be constant.

Further, in order to prevent the solder from being greatly constricted on the second outer electrode 28, it is important to make the second wall portion 30*b* and the region on the second outer electrode 28 apart from each other. Thus, as illustrated in FIG. 22, a distance between the second outer electrode 28 and the side surface of the second wall portion 30*b* on the side of the second outer electrode 28 preferably increases from the side of the semiconductor substrate 10 toward the side opposite from the semiconductor substrate 10. That is, when the first resin body 30 includes a plurality of wall portions, it is preferable that a distance between the second outer electrode 28 and a wall portion provided closest to the side of the second outer electrode 28 among the plurality of wall portions, here, the side surface of the second wall portion 30*b* on the side of the second outer electrode 28 increase from the side of the semiconductor substrate 10 toward the side opposite from the semiconductor substrate 10. It is also noted that, as long as the side surface of the second wall portion 30*b* on the side of the first outer electrode 27 and the side surface of the second wall portion 30*b* on the side of the second outer electrode 28 approach each other from the side of the semiconductor substrate 10 toward the side opposite from the semiconductor substrate 10, a distance between the second outer electrode 28 and the side surface of the second wall portion 30*b* on the side of the first outer electrode 27 may decrease from the side of the semiconductor substrate 10 toward the side opposite from the semiconductor substrate 10, or may be constant. In other words, the distance between the first outer electrode 27 and the side surface of the second wall portion 30*b* on the side of the first outer electrode 27 may increase from the side of the semiconductor substrate 10 toward the side opposite from the semiconductor substrate 10, or may be constant.

Meanwhile, as illustrated in FIG. 16, when one wall portion is provided as the first resin body 30, it is preferable that both the distance between the first outer electrode 27 and the side surface of the first resin body 30 on the side of the first outer electrode 27 and the distance between the second outer electrode 28 and the side surface of the first resin body 30 on the side of the second outer electrode 28 increase from the side of the semiconductor substrate 10 toward the side opposite from the semiconductor substrate 10.

In the semiconductor device of the third modification of the second exemplary embodiment, a second resin body 40 having a first outer peripheral portion 40*a* and a second outer peripheral portion 40*b* as illustrated in FIG. 22 may be provided similarly to the semiconductor device of the second modification of the second exemplary embodiment. In the second resin body 40, similarly to the first resin body 30, in sectional view as illustrated in FIG. 22, it is preferable that the width of each of sectional shapes of the first outer peripheral portion 40*a* and the second outer peripheral portion 40*b* decrease from the side of the semiconductor substrate 10 toward the side opposite from the semiconductor substrate 10. More specifically, it is preferable that a distance between the first outer electrode 27 and the side surface of the first outer peripheral portion 40*a* on the side of the first outer electrode 27 increase from the side of the semiconductor substrate 10 toward the side opposite from the semiconductor substrate 10. Further, it is preferable that a distance between the second outer electrode 28 and the side surface of the second outer peripheral portion 40*b* on the side of the second outer electrode 28 increase from the side of the semiconductor substrate 10 toward the side opposite from the semiconductor substrate 10.

A module of the third modification of the second exemplary embodiment is the same as the module of the first exemplary embodiment except for including the semiconductor device of the third modification of the second exemplary embodiment.

[Fourth Modification of the Second Exemplary Embodiment]

In the semiconductor device of a fourth modification of the second exemplary embodiment, it is acceptable that, a second resin body is provided on a surface of a circuit layer on a side opposite from a semiconductor substrate, and the second resin body includes a first outer peripheral portion provided between an end portion of the semiconductor substrate and a first outer electrode in the plan view and a second outer peripheral portion provided between the end portion of the semiconductor substrate and a second outer electrode in the plan view; a first wall portion and the first outer peripheral portion are connected to each other, a second wall portion and the second outer peripheral portion are connected to each other, the first wall portion has a first opening communicating with a space separating the first wall portion and the second wall portion, and the second wall portion has a second opening communicating with the space separating the first wall portion and the second wall portion. Such an example will be described below as a semiconductor device of the fourth modification of the second exemplary embodiment.

Figure 23:
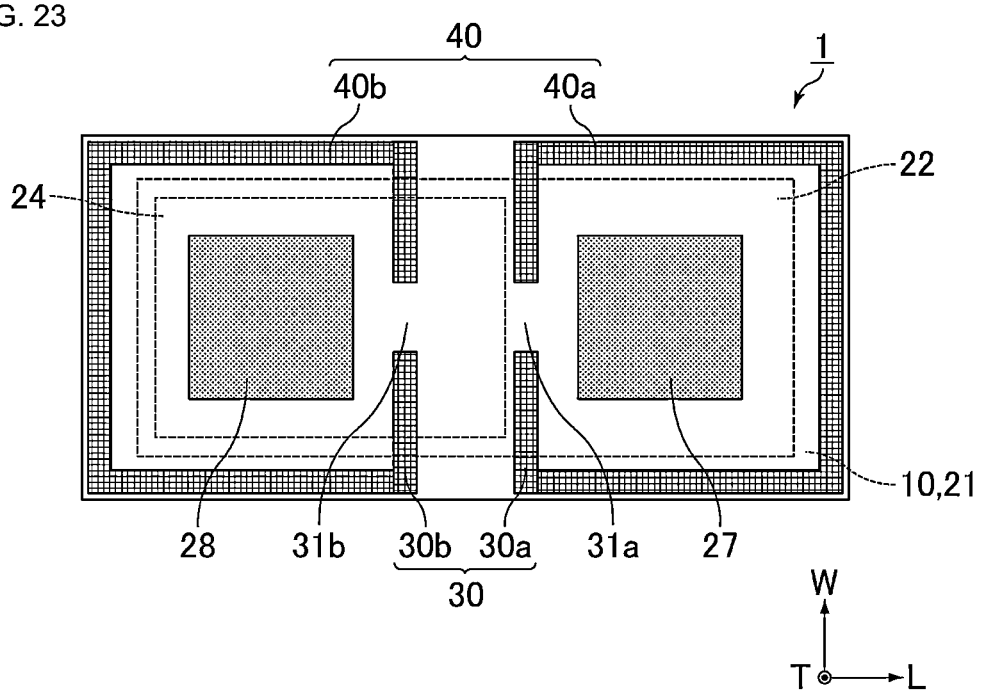
FIG. 23 is a schematic plan view of a semiconductor device of a fourth modification of the second exemplary embodiment.

FIG. 23 is a schematic plan view of the semiconductor device of the fourth modification of the second exemplary embodiment.

A second resin body 40 is provided on the surface of the circuit layer 20 on the side opposite from the semiconductor substrate 10.

As shown, the second resin body 40 includes a first outer peripheral portion 40a provided between the end portion of the semiconductor substrate 10 and the first outer electrode 27 in the plan view as illustrated in FIG. 23, and a second outer peripheral portion 40b provided between the end portion of the semiconductor substrate 10 and the second outer electrode 28 in the plan view as illustrated in FIG. 23.

The first outer peripheral portion 40a may be provided along the end portion of the semiconductor substrate 10. More specifically, the first outer peripheral portion 40a may be provided around the first outer electrode 27 along both ends of the semiconductor substrate 10 extending in the length direction L and one end of the semiconductor substrate 10 extending in the width direction W.

The second outer peripheral portion 40b may be provided along the end portion of the semiconductor substrate 10. More specifically, the second outer peripheral portion 40b may be provided around the second outer electrode 28 along both ends of the semiconductor substrate 10 extending in the length direction L and the other end of the semiconductor substrate 10 extending in the width direction W.

A first wall portion 30a and the first outer peripheral portion 40a are connected to each other. Further, a second wall portion 30b and the second outer peripheral portion 40b are connected to each other.

The first wall portion 30a has a first opening 31a communicating with a space separating the first wall portion 30a and the second wall portion 30b. Further, the second wall portion 30b has a second opening 31b communicating with the space separating the first wall portion 30a and the second wall portion 30b.

Since the first wall portion 30a and the second wall portion 30b respectively have the first opening 31a and the second opening 31b as shown in FIG. 23, for example, when the semiconductor device 1 is mounted on a wiring substrate to form a module, the following effect is obtained. After the semiconductor device 1 is mounted on a wiring substrate, when the space separating the first wall portion 30a and the second wall portion 30b is filled with a mold resin, the vicinity of the first outer electrode 27 is easily filled with the mold resin through the first opening 31a communicating with the space, and the vicinity of the second outer electrode 28 is easily filled with the mold resin through the second opening 31b.

Similarly to the semiconductor device of the second modification of the second exemplary embodiment, in sectional view, the tip end of the second resin body 40 on the side opposite from the semiconductor substrate 10, here, the tip ends of the first outer peripheral portion 40a and the second outer peripheral portion 40b on the side opposite from the semiconductor substrate 10 are preferably positioned lower than the tip end of the first resin body 30 on the side opposite from the semiconductor substrate 10, here, the tip ends of the first wall portion 30a and the second wall portion 30b on the side opposite from the semiconductor substrate 10.

A module of the fourth modification of the second exemplary embodiment is the same as the module of the first exemplary embodiment except for including the semiconductor device of the fourth modification of the second exemplary embodiment.

[Firth Modification of the Second Exemplary Embodiment]

In the semiconductor device of the second exemplary embodiment, in the plan view, a wall portion may extend to a region connecting an end portion of the first outer electrode and an end portion of the second outer electrode facing each other. Such an example will be described below as a semiconductor device of fifth modification of the second exemplary embodiment.

Figure 24:
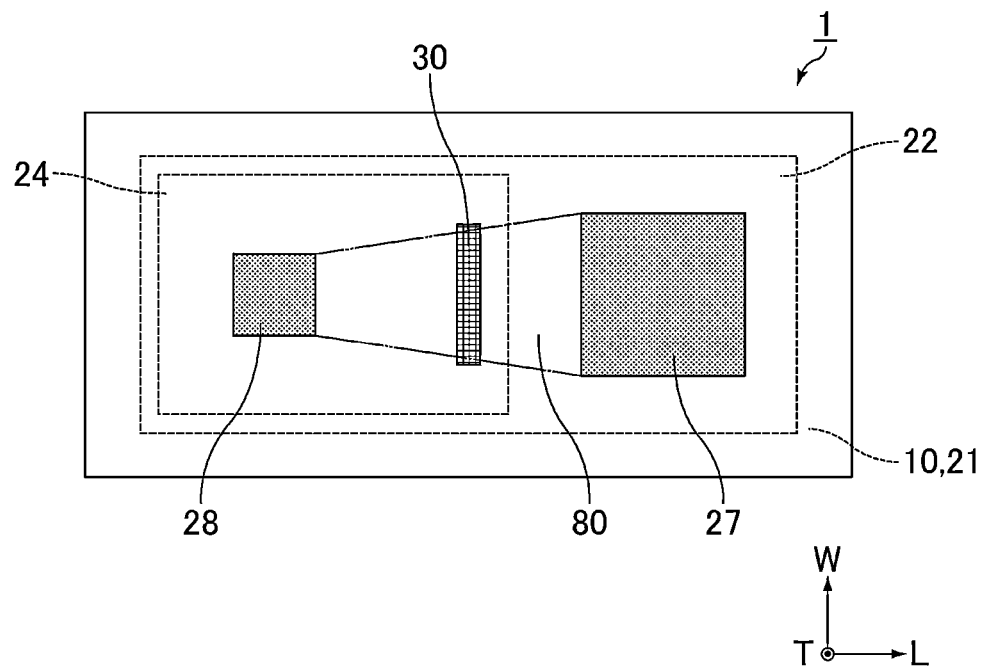
FIG. 24 is a schematic plan view of a semiconductor device of a fifth modification of the second exemplary embodiment.

FIG. 24 is a schematic plan view of the semiconductor device of the fifth modification of the second exemplary embodiment.

As shown in the plan view as illustrated in FIG. 24, a first resin body 30 as a wall portion extends in a region 80 connecting an end portion of the first outer electrode 27 and an end portion of the second outer electrode 28 facing each other.

Figure 25:
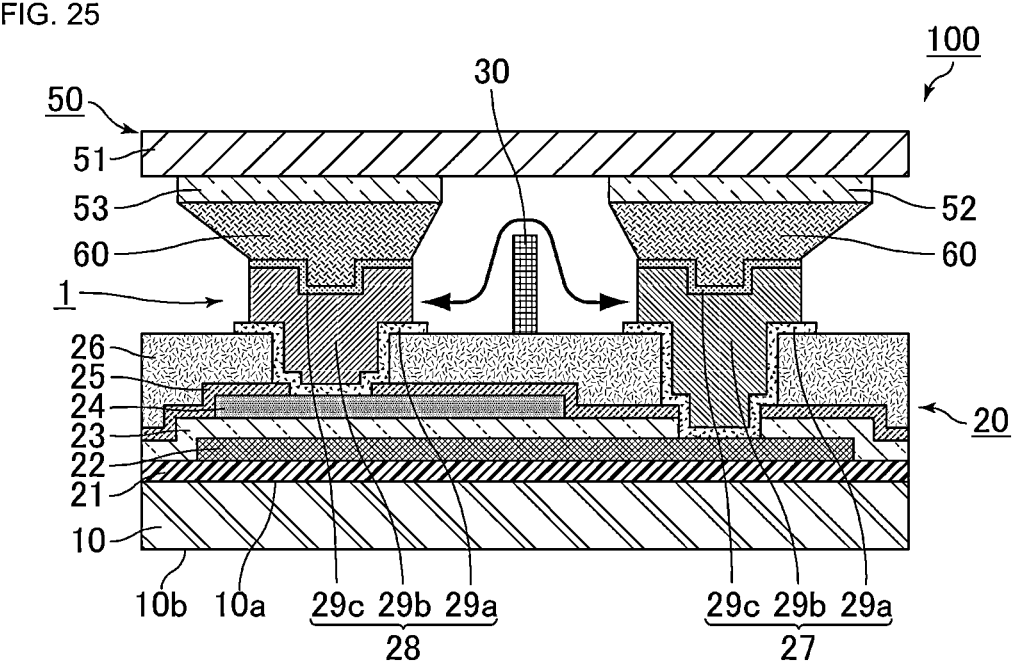
FIG. 25 is a schematic sectional view of a module of the fifth modification of the second exemplary embodiment.

FIG. 25 is a schematic sectional view of a module of fifth modification 5 of the second exemplary embodiment. The module of the fifth modification of the second exemplary embodiment is the same as the module of the first exemplary embodiment except for including the semiconductor device of the fifth modification of the second exemplary embodiment. Since the first resin body 30 extends in the region 80 in the plan view as illustrated in FIG. 24, when the semiconductor device 1 is mounted on the wiring substrate 50 to form the module 100 as illustrated in FIG. 25, even in a case that spread of the solder 60, so-called solder splash occurs, a path through which the solder 60 spreads out becomes longer by the size of the first resin body 30 as illustrated with arrows in FIG. 25. Consequently, a short circuit between the first outer electrode 27 and the second outer electrode 28 due to solder splash may be suppressed.

Such an operational effect may similarly be obtained when the semiconductor device 1 illustrated in each of FIGS. 16, 18, and 20 is mounted on a wiring substrate to form a module.

[Sixth Modification of the Second Exemplary Embodiment]

In the semiconductor device of a sixth modification of the second exemplary embodiment, it is acceptable that, a wall portion includes a first wall portion provided on a side of a first outer electrode and a second wall portion provided on a side of a second outer electrode and separated from the first wall portion; a second resin body is provided on a surface of a circuit layer on a side opposite from a semiconductor substrate, and the second resin body includes a first outer peripheral portion provided between an end portion of the semiconductor substrate and the first outer electrode in the plan view and a second outer peripheral portion provided between the end portion of the semiconductor substrate and the second outer electrode in the plan view; the first wall portion and the first outer peripheral portion are connected to each other, the second wall portion and the second outer peripheral portion are connected to each other, the first wall portion has a first opening communicating with a space separating the first wall portion and the second wall portion, the second wall portion has a second opening communicating with the space separating the first wall portion and the second wall portion, and in a direction from the second outer electrode toward the first outer electrode, the first opening faces the second wall portion and the second opening faces the first wall portion. Such an example will be described below as a semiconductor device of a sixth modification of the second exemplary embodiment.

Figure 26:
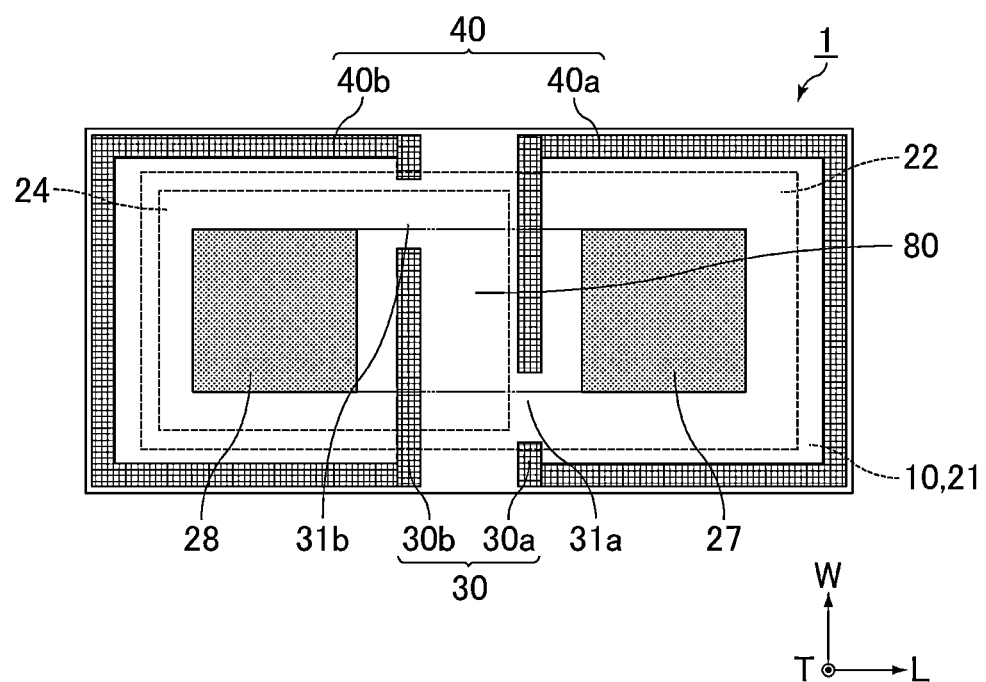
FIG. 26 is a schematic plan view of a semiconductor device of a sixth modification of the second exemplary embodiment.

FIG. 26 is a schematic plan view of the semiconductor device of the sixth modification of the second exemplary embodiment.

As illustrated in FIG. 26, a first resin body 30 as a wall portion includes a first wall portion 30a provided on the side of the first outer electrode 27, and a second wall portion 30b provided on the side of the second outer electrode 28 and separated from the first wall portion 30a.

Moreover, a second resin body 40 is provided on the surface of the circuit layer 20 on the side opposite from the semiconductor substrate 10.

The second resin body 40 includes a first outer peripheral portion 40a provided between the end portion of the semiconductor substrate 10 and the first outer electrode 27 in the plan view as illustrated in FIG. 26, and a second outer peripheral portion 40b provided between the end portion of the semiconductor substrate 10 and the second outer electrode 28 in the plan view as illustrated in FIG. 26.

The first outer peripheral portion 40a may be provided along the end portion of the semiconductor substrate 10. More specifically, the first outer peripheral portion 40a may be provided around the first outer electrode 27 along both ends of the semiconductor substrate 10 extending in the length direction L and one end of the semiconductor substrate 10 extending in the width direction W.

Similarly, the second outer peripheral portion 40b may be provided along the end portion of the semiconductor substrate 10. More specifically, the second outer peripheral portion 40b may be provided around the second outer electrode 28 along both ends of the semiconductor substrate 10 extending in the length direction L and the other end of the semiconductor substrate 10 extending in the width direction W.

The first wall portion 30a and the first outer peripheral portion 40a are connected to each other. Similarly, the second wall portion 30b and the second outer peripheral portion 40b are connected to each other.

As further shown, the first wall portion 30a has a first opening 31a communicating with a space separating the first wall portion 30a and the second wall portion 30b. Likewise, the second wall portion 30b has a second opening 31b communicating with the space separating the first wall portion 30a and the second wall portion 30b.

In the direction from the second outer electrode 28 toward the first outer electrode 27, that is, in the length direction L, the first opening 31a faces the second wall portion 30b, and the second opening 31b faces the first wall portion 30a.

Since the first wall portion 30a and the second wall portion 30b respectively have the first opening 31a and the second opening 31b, when the semiconductor device 1 is mounted on a wiring substrate to form a module, the following effect is obtained. After the semiconductor device 1 is mounted on a wiring substrate, when the space separating the first wall portion 30a and the second wall portion 30b is filled with a mold resin, the vicinity of the first outer electrode 27 is easily filled with the mold resin through the first opening 31a communicating with the space, and the vicinity of the second outer electrode 28 is easily filled with the mold resin through the second opening 31b. Further, the first opening 31a faces the second wall portion 30b and the second opening 31b faces the first wall portion 30a in the length direction L, that is, the first opening 31a and the second opening 31b do not face each other. Consequently, even in a case that the solder splash occurs when the semiconductor device 1 is mounted on a wiring substrate to form a module, the first wall portion 30a and the second wall portion 30b serve as barriers. Thus, short circuit between the first outer electrode 27 and the second outer electrode 28 may be suppressed.

Similarly to the semiconductor device of the second modification of the second exemplary embodiment, in sectional view, the tip end of the second resin body 40 on the side opposite from the semiconductor substrate 10, here, the tip ends of the first outer peripheral portion 40a and the second outer peripheral portion 40b on the side opposite from the semiconductor substrate 10 are preferably positioned lower than the tip end of the first resin body 30 on the side opposite from the semiconductor substrate 10, here, the tip ends of the first wall portion 30a and the second wall portion 30b on the side opposite from the semiconductor substrate 10.

A module of the sixth modification of the second exemplary embodiment is the same as the module of the first exemplary embodiment except for including the semiconductor device of the sixth modification of the second exemplary embodiment.

REFERENCE SIGNS LIST

1 SEMICONDUCTOR DEVICE
10 SEMICONDUCTOR SUBSTRATE
10a FIRST MAIN SURFACE OF SEMICONDUCTOR SUBSTRATE
10b SECOND MAIN SURFACE OF SEMICONDUCTOR SUBSTRATE
20 CIRCUIT LAYER
21 INSULATION LAYER
22 FIRST ELECTRODE LAYER
23 DIELECTRIC LAYER
24 SECOND ELECTRODE LAYER
25 MOISTURE-RESISTANT PROTECTION LAYER
26 RESIN PROTECTION LAYER
27 FIRST OUTER ELECTRODE
28 SECOND OUTER ELECTRODE
29a SEED LAYER
29b FIRST PLATING LAYER
29c SECOND PLATING LAYER
30 FIRST RESIN BODY
30a FIRST WALL PORTION
30b SECOND WALL PORTION
31a FIRST OPENING
31b SECOND OPENING
35 PHOTOSENSITIVE RESIN FILM
40 SECOND RESIN BODY
40a FIRST OUTER PERIPHERAL PORTION
40b SECOND OUTER PERIPHERAL PORTION
50 WIRING SUBSTRATE
51 SUBSTRATE
52 FIRST LAND
53 SECOND LAND
60 SOLDER
70 MOLD RESIN
80 REGION
100 MODULE
L LENGTH DIRECTION

L1 DISTANCE BETWEEN FIRST WALL PORTION AND FIRST OUTER ELECTRODE
L2 DISTANCE BETWEEN FIRST WALL PORTION AND CENTER POSITION BETWEEN FIRST OUTER ELECTRODE AND SECOND OUTER ELECTRODE
L3 DISTANCE BETWEEN SECOND WALL PORTION AND SECOND OUTER ELECTRODE
L4 DISTANCE BETWEEN SECOND WALL PORTION AND CENTER POSITION BETWEEN FIRST OUTER ELECTRODE AND SECOND OUTER ELECTRODE
T THICKNESS DIRECTION
W WIDTH DIRECTION
Z CENTER POSITION BETWEEN FIRST OUTER ELECTRODE AND SECOND OUTER ELECTRODE

The invention claimed is:

1. A semiconductor device, comprising:
a semiconductor substrate having a first main surface and a second main surface opposite to each other in a thickness direction;
a circuit layer disposed on the first main surface of the semiconductor substrate and including:
a first electrode layer disposed on a side of the semiconductor substrate,
a second electrode layer disposed above the first electrode layer,
a dielectric layer interposed between the first and second electrode layers in the thickness direction,
a first outer electrode electrically connected to the first electrode layer and extending to a surface of the circuit layer on a side opposite the semiconductor substrate, and
a second outer electrode electrically connected to the second electrode layer and extending to the surface of the circuit layer on the side opposite from the semiconductor substrate; and
a first resin body that protrudes from the surface of the circuit layer and in between the first and second outer electrodes in a plan view of the surface of the circuit layer,
wherein, in a sectional view, a tip end of the first resin body on the side opposite the semiconductor substrate is positioned higher than respective tip ends of the first and second outer electrodes on the side opposite from the semiconductor substrate,
wherein the first outer electrode overlaps the first electrode layer in the plan view of the surface of the circuit layer, and
wherein the second outer electrode overlaps the second electrode layer in the plan view of the surface of the circuit layer.

2. The semiconductor device according to claim 1, wherein, in the plan view, the first resin body is disposed at at least three separate positions that surround a center of the semiconductor substrate.

3. The semiconductor device according to claim 1, wherein the first resin body includes a wall portion that extends in a direction orthogonal to the thickness direction and that intersects a direction from the second outer electrode toward the first outer electrode.

4. The semiconductor device according to claim 3, wherein the wall portion includes a first wall disposed on a side of the first outer electrode, and a second wall disposed on a side of the second outer electrode and that is separated from the first wall.

5. The semiconductor device according to claim 1, wherein the first resin body comprises an indentation elastic modulus that is lower than an indentation elastic modulus of the dielectric layer.

6. The semiconductor device according to claim 1, wherein the first resin body comprises a Young's modulus that is 20 GPa or less.

7. The semiconductor device according to claim 1, wherein the first resin body includes at least one resin selected from the group consisting of a resin in a solder resist, polyimide, polyimideamide, and an epoxy resin.

8. The semiconductor device according to claim 1, wherein the first resin body is a cured product of a photosensitive resin.

9. The semiconductor device according to claim 1, wherein the dielectric layer includes at least one of silicon nitride or silicon oxide.

10. The semiconductor device according to claim 1, further comprising a resin protection layer that is disposed in the thickness direction between the second electrode layer and the first resin body.

11. The semiconductor device according to claim 1, further comprising a second resin body disposed on the surface of the circuit layer on the side opposite from the semiconductor substrate, with the second resin body including a first outer peripheral portion disposed between an end portion of the semiconductor substrate and the first outer electrode along the end portion of the semiconductor substrate in the plan view, and a second outer peripheral portion disposed between the end portion of the semiconductor substrate and the second outer electrode along the end portion of the semiconductor substrate in the plan view.

12. The semiconductor device according to claim 3, wherein, in the sectional view, a side surface of the wall portion on a side of the first outer electrode and a side surface of the wall portion on a side of the second outer electrode approach each other from the side of the semiconductor substrate toward the side opposite from the semiconductor substrate.

13. The semiconductor device according to claim 3, wherein, in the plan view, the wall portion extends in a region connecting an end portion of the first outer electrode and an end portion of the second outer electrode facing each other.

14. The semiconductor device according to claim 13,
wherein the wall portion includes a first wall disposed on a side of the first outer electrode and a second wall disposed on a side of the second outer electrode and separated from the first wall,
wherein a second resin body is disposed on the surface of the circuit layer on the side opposite from the semiconductor substrate,
wherein the second resin body includes a first outer peripheral portion disposed between an end portion of the semiconductor substrate and the first outer electrode in the plan view, and a second outer peripheral portion disposed between the end portion of the semiconductor substrate and the second outer electrode in the plan view,
wherein the first wall and the first outer peripheral portion are connected to each other,
wherein the second wall and the second outer peripheral portion are connected to each other,
wherein the first wall has a first opening communicating with a space separating the first wall and the second wall, wherein the second wall has a second opening communicating with the space separating the first wall and the second wall, and
wherein the first opening faces the second wall and the second opening faces the first wall in the direction from the second outer electrode toward the first outer electrode.

15. The semiconductor device according to claim 11,
wherein the first electrode layer is disposed up to a position separated from the end portion of the semiconductor substrate, and
wherein, in the sectional view, a tip end of the second resin body on the side opposite from the semiconductor substrate is positioned lower than a tip end of the first resin body on the side opposite from the semiconductor substrate.

16. A module, comprising:
the semiconductor device according to claim 1, and
a wiring substrate having a first land electrically connected to the first outer electrode and a second land electrically connected to the second outer electrode.

17. The module according to claim 16, further comprising a mold resin disposed between the wiring substrate and each of the first outer electrode and the second outer electrode.

18. A semiconductor device comprising:
a semiconductor substrate having a first main surface and a second main surface opposite to each other in a thickness direction;
a circuit layer disposed on the first main surface of the semiconductor substrate and including:
 a first electrode layer disposed on a side of the semiconductor substrate,
 a second electrode layer disposed above the first electrode layer,
 a dielectric layer interposed between the first and second electrode layers in the thickness direction,
 a first outer electrode electrically connected to the first electrode layer and extending to a surface of the circuit layer on a side opposite the semiconductor substrate, and
 a second outer electrode electrically connected to the second electrode layer and extending to the surface of the circuit layer on the side opposite from the semiconductor substrate; and
a first resin body disposed on the surface of the circuit layer and in between the first and second outer electrodes in a plan view of the surface of the circuit layer,
wherein, in a sectional view, a tip end of the first resin body on the side opposite the semiconductor substrate is positioned higher than respective tip ends of the first and second outer electrodes on the side opposite from the semiconductor substrate,
wherein the first resin body includes a wall portion that extends in a direction orthogonal to the thickness direction and that intersects a direction from the second outer electrode toward the first outer electrode,
wherein the wall portion includes a first wall disposed on a side of the first outer electrode, and a second wall disposed on a side of the second outer electrode and that is separated from the first wall,
wherein a distance L1 between the first wall and the first outer electrode is shorter than a distance L2 between the first wall and a center position between the first outer electrode and the second outer electrode, and
wherein a distance L3 between the second wall and the second outer electrode is shorter than a distance L4 between the second wall and a center position between the first outer electrode and the second outer electrode.

19. The semiconductor device according to claim 18, wherein the first wall and the first outer electrode are separated from each other, and the second wall and the second outer electrode are separated from each other.

20. A semiconductor device comprising:
a semiconductor substrate having a first main surface and a second main surface opposite to each other in a thickness direction;
a circuit layer disposed on the first main surface of the semiconductor substrate and including:
 a first electrode layer disposed on a side of the semiconductor substrate,
 a second electrode layer disposed above the first electrode layer,
 a dielectric layer interposed between the first and second electrode layers in the thickness direction,
 a first outer electrode electrically connected to the first electrode layer and extending to a surface of the circuit layer on a side opposite the semiconductor substrate, and
 a second outer electrode electrically connected to the second electrode layer and extending to the surface of the circuit layer on the side opposite from the semiconductor substrate;
a first resin body disposed on the surface of the circuit layer and in between the first and second outer electrodes in a plan view of the surface of the circuit layer; and
a second resin body disposed on the surface of the circuit layer on the side opposite from the semiconductor substrate,
wherein, in a sectional view, a tip end of the first resin body on the side opposite the semiconductor substrate is positioned higher than respective tip ends of the first and second outer electrodes on the side opposite from the semiconductor substrate,
wherein the first resin body includes a wall portion that extends in a direction orthogonal to the thickness direction and that intersects a direction from the second outer electrode toward the first outer electrode,
wherein the wall portion includes a first wall disposed on a side of the first outer electrode, and a second wall disposed on a side of the second outer electrode and that is separated from the first wall,
wherein the second resin body includes a first outer peripheral portion disposed between an end portion of the semiconductor substrate and the first outer electrode in the plan view, and a second outer peripheral portion disposed between the end portion of the semiconductor substrate and the second outer electrode in the plan view,
wherein the first wall and the first outer peripheral portion are connected to each other,
wherein the second wall and the second outer peripheral portion are connected to each other,
wherein the first wall has a first opening communicating with a space separating the first wall and the second wall, and
wherein the second wall has a second opening communicating with the space separating the first wall and the second wall.

* * * * *